US012150172B2

(12) United States Patent
Bhattad et al.

(10) Patent No.: US 12,150,172 B2
(45) Date of Patent: Nov. 19, 2024

(54) CONSTRAINTS ON NO LISTEN-BEFORE-TALK (LBT) TRANSMISSION DURING UPLINK/DOWNLINK (UL/DL) SWITCHES

(71) Applicant: QUALCOMM Incorporated, San Diego, CA (US)

(72) Inventors: Kapil Bhattad, Bangalore (IN); Xiaoxia Zhang, San Diego, CA (US); Tanumay Datta, Bangalore (IN); Ananta Narayanan Thyagarajan, Bangalore (IN); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/654,649

(22) Filed: Mar. 14, 2022

(65) Prior Publication Data
US 2022/0201749 A1    Jun. 23, 2022

Related U.S. Application Data

(63) Continuation of application No. 16/689,963, filed on Nov. 20, 2019, now Pat. No. 11,304,229.

(30) Foreign Application Priority Data
Dec. 6, 2018    (IN) .............................. 201841046152

(51) Int. Cl.
*H04W 74/0808*    (2024.01)
*H04W 16/14*    (2009.01)
*H04W 74/00*    (2009.01)

(52) U.S. Cl.
CPC ....... *H04W 74/0808* (2013.01); *H04W 16/14* (2013.01); *H04W 74/002* (2013.01)

(58) Field of Classification Search
CPC ............. H04W 74/0808; H04W 16/14; H04W 74/002
See application file for complete search history.

(56) References Cited

U.S. PATENT DOCUMENTS

| 2015/0110012 A1* | 4/2015 | Bhushan ........... H04W 74/0816 370/329 |
| 2016/0278078 A1 | 9/2016 | Cheng et al. |

(Continued)

FOREIGN PATENT DOCUMENTS

WO    2017199205 A1    11/2017

OTHER PUBLICATIONS

Ericsson: "On Channel Access Procedures for Transmissions with Only UL Grants", 3GPP Draft, 3GPP TSG-RAN WG1#85, R1-165155, 3rd Generation Partnership Project (3GPP), Mobile Competence Centre, 650, Route Des Lucioles, F-06921 Sophia-Antipolis Cedex, France, vol. RAN WG1, No. Nanjing, China, May 23, 2016-May 27, 2016, May 14, 2016 (May 14, 2016), XP051096241, 3 Pages, Retrieved from the Internet: URL: http://www.3gpp.org/ftp/tsg_ran/WG1_RL1/TSGR1_85/Docs/, [retrieved on May 14, 2016], the whole document.

(Continued)

*Primary Examiner* — Siren Wei
(74) *Attorney, Agent, or Firm* — Haynes and Boone, LLP/Qualcomm Incorporated

(57) ABSTRACT

Wireless communications systems and methods are provided. A method of wireless communication may include performing a first listen-before-talk (LBT) procedure associated with a channel, wherein a channel occupancy time (COT) for the channel is acquired based on the first LBT being successful, communicating a first communication signal in a first link direction during the COT, switching from the first link direction to a second link direction different from the first link direction, and communicating (Continued)

after the switching, a second communication signal in the second link direction without performing a second LBT.

27 Claims, 18 Drawing Sheets

(56) References Cited

U.S. PATENT DOCUMENTS

| | | | |
|---|---|---|---|
| 2017/0238342 A1 | 8/2017 | Yang et al. | |
| 2017/0280475 A1* | 9/2017 | Yerramalli | H04W 72/56 |
| 2017/0359808 A1* | 12/2017 | Dinan | H04L 5/0053 |
| 2018/0191547 A1 | 7/2018 | Mukherjee et al. | |
| 2019/0132875 A1 | 5/2019 | Ljung | |
| 2019/0159253 A1 | 5/2019 | Koorapaty et al. | |
| 2019/0342915 A1* | 11/2019 | Kim | H04W 72/20 |
| 2020/0053778 A1 | 2/2020 | Babaei et al. | |
| 2020/0146058 A1* | 5/2020 | Xu | H04W 72/0453 |
| 2020/0187250 A1 | 6/2020 | Bhattad | |
| 2021/0153245 A1* | 5/2021 | Tooher | H04W 74/006 |
| 2021/0204322 A1* | 7/2021 | Lou | H04W 74/0875 |
| 2021/0392684 A1* | 12/2021 | Tiirola | H04W 72/0453 |

OTHER PUBLICATIONS

Huawei, et al., "UL Category 4 LBT with eNB assistance", 3GPP Draft, 3GPP Tsg Ran WG1 Meeting #85, R1-164072, 3rd Generation Partnership Project (3GPP), Mobile Competence Centre, 650, Route Des Lucioles, F-06921 Sophia-Antipolis Cedex, France, vol. Ran WG1, No. Nanjing, China, 20160523 - 20160527, May 14, 2016 (2016-05-14), XP051096612, 5 Pages, Retrieved from the Internet: URL: http://www.3gpp.org/ftp/tsg_ran/WG1_RL1/TSGR1_85/Docs/, [retrieved on 2016-05-14], the whole document.
International Preliminary Report on Patentability—PCT/US2019/062625, The International Bureau of WIPO—Geneva, Switzerland, Jun. 17, 2021.
International Search Report and Written Opinion—PCT/US2019/062625—ISA/EPO—dated Feb. 19, 2020.

* cited by examiner

CONSTRAINTS ON NO LISTEN-BEFORE-TALK (LBT) TRANSMISSION DURING UPLINK/DOWNLINK (UL/DL) SWITCHES

CROSS REFERENCE TO RELATED APPLICATIONS

The present application claims priority to and the benefit of Indian Provisional Patent Application No. 201841046152, filed Dec. 6, 2018, and U.S. Non-Provisional patent application Ser. No. 16/689,963, filed Nov. 20, 2019, each of which is hereby incorporated by reference in its entirety as if fully set forth below and for all applicable purposes.

TECHNICAL FIELD

This application relates to wireless communication systems, and more particularly to constraining no-listen-before-talk (LBT)-based transmissions during link direction switches in a frequency spectrum shared by multiple network operating entities.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to avoiding collisions when communicating in a shared spectrum or an unlicensed spectrum is to use an LBT procedure to ensure that the shared channel is clear before transmitting a signal in the shared channel. The operations or deployments of NR in an unlicensed spectrum is referred to as NR-U. In NR-U, a BS may acquire a medium by performing a category 4 (CAT4) LBT. The BS may reserve the medium for a period of time, which may be referred to as channel occupancy time (COT). For example, a BS may acquire a COT in the medium. The BS may transmit downlink (DL) traffic to the UE during the COT. The BS may share the COT with the UE so that the UE may also transmit uplink (UL) traffic to the BS during the BS's COT. Prior to each UL transmission during the BS's COT, the UE may perform a category 2 (CAT2) LBT. However, in some instances, the UL transmission (e.g., UL control traffic) may have a small data size, and thus the transmission duration may be short. As such, the overhead of performing a CAT2 LBT prior to each UL transmission may be high. However, it may not be ideal for a node to transmit without any LBT for a long time as the interference scenario around the node may vary over time.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication, includes communicating, by a first wireless communication device with a second wireless communication device, a configuration for determining whether to perform a listen-before-talk (LBT) after a link direction switch; communicating, by the first wireless communication device with the second wireless communication device, a first communication signal in a first link direction during a channel occupancy time (COT) period of the first wireless communication device or the second wireless communication device; and communicating, by the first wireless communication device with the second wireless communication device, a second communication signal in a second link direction different from the first link direction during the COT period based on the configuration.

In an additional aspect of the disclosure, an apparatus includes a transceiver configured to communicate, with a first wireless communication device, a configuration for determining whether to perform a listen-before-talk (LBT) after a link direction switch; communicate, with the first wireless communication device, a first communication signal in a first link direction during a channel occupancy time (COT) period of the first wireless communication device or the first wireless communication device; and communicate, with the first wireless communication device, a second communication signal in a second link direction different from the first link direction during the COT period based on the configuration.

In an additional aspect of the disclosure, a computer-readable medium having program code recorded thereon, the program code includes code for causing a first wireless communication device to communicate, with a second wireless communication device, a configuration for determining whether to perform a listen-before-talk (LBT) after a link direction switch; code for causing the first wireless communication device to communicate, with the second wireless communication device, a first communication signal in a first link direction during a channel occupancy time (COT) period of the first wireless communication device or the second wireless communication device; and code for causing the first wireless communication device to communicate, with the second wireless communication device, a second communication signal in a second link direction different from the first link direction during the COT period based on the configuration.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
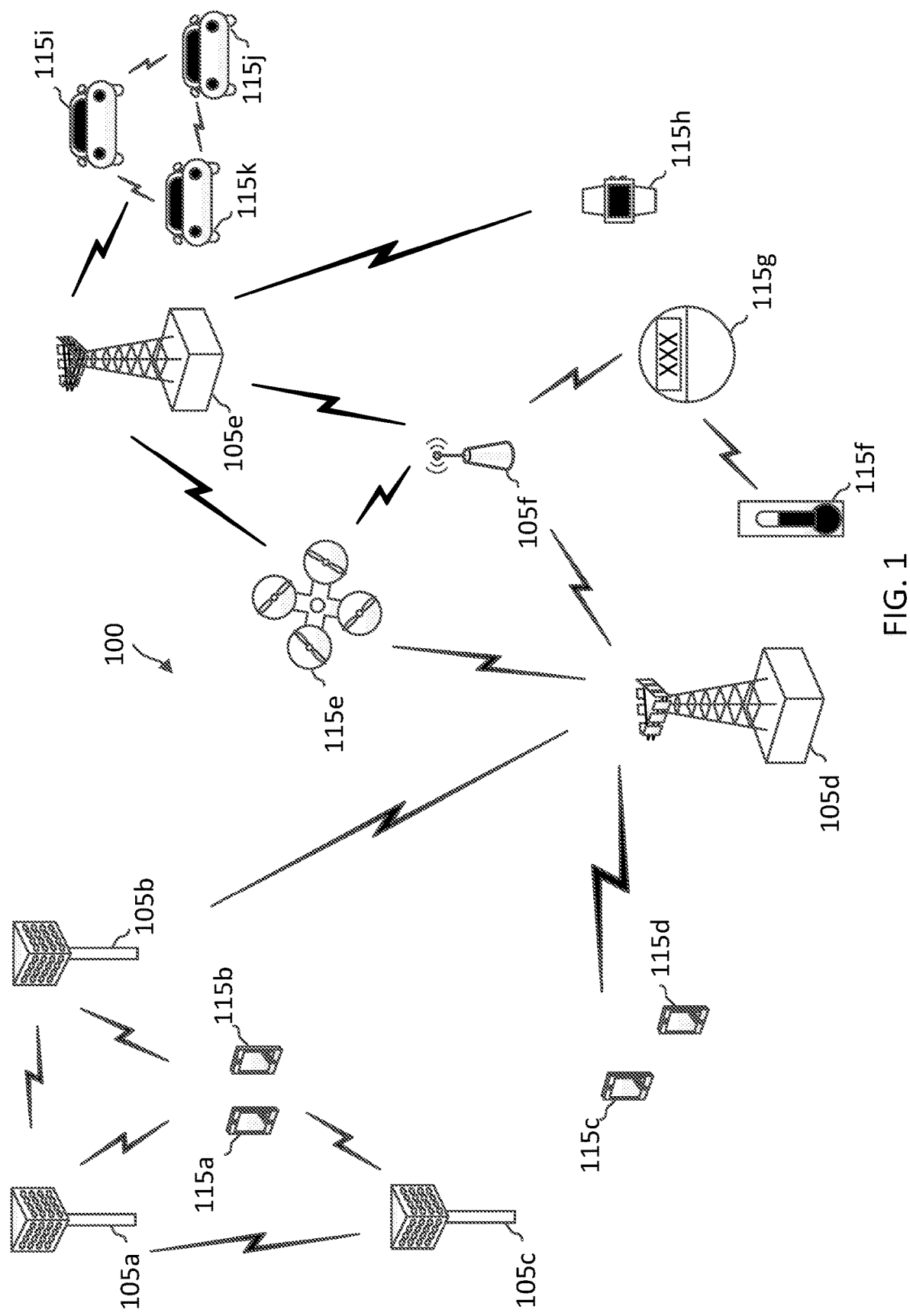
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 404.11, IEEE 404.16, IEEE 404.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for constraining no-LBT-based transmissions during link switches in a frequency spectrum shared by multiple network operating entities. A no-LBT-based transmission refer to a transmission without having to perform an LBT prior to the transmission. A link switch may refer to a UL-to-DL switch or a DL-to-UL switch. In the disclosed embodiments, a BS may reserve or acquire a maximum channel occupancy time (MCOT) period in a shared channel by performing a category 4 (CAT4) LBT. The BS may use the MCOT period for DL transmissions to one or more UEs. The BS may additionally share the MCOT period with the one or more UEs. The BS may allow a UE to transmit in a UL direction during the MCOT period without performing an LBT prior to the UL transmission. The BS may configure the UE with rules for determining when a no-LBT-based UL transmission is allowed. The rules may be defined based on a link switch duration, a transmission duration before a link switch, a transmission duration after a link switch, a data type (e.g., control information or data information) or data priority (e.g., ultra-reliable low-latency communication (URLLC) traffic or feedbacks) of a transmission after a link switch, and/or a number of link switches in a MCOT period of the BS or between LBTs within the MCOT period. Some rules may be UE-specific, while other rules may be common for all UEs. The BS may configure the UEs via a radio resource control (RRC) configuration, a physical downlink control channel (PDCCH) downlink control information (DCI), and/or group-common-PDCCH (GC-PDCCH) DCI.

In an embodiment, the ownership of a COT within the MCOT period can be transferred from one node to another node when the other node performed a successful LBT within the MCOT period. The transferring of the COT ownership allows the other node to transmit without performing an LBT, for example, for at least a period of time.

In an embodiment, a UE may acquire or reserve a MCOT period in a shared channel by performing a CAT4 LBT. The UE may use the MCOT period for UL transmissions to a BS. The UE may additionally share the MCOT period with the BS, for example, by using substantially similar rules as the rules used by the BS to share a MCOT period of the BS. The UE may additionally define rules for the BS to determine whether the BS is allowed to communicate DL and/or UL communications with another UE within the UE's MCOT period.

Aspects of the present application can provide several benefits. For example, the allowing of no-LBT-based transmissions after a link switch during at least a duration within a MCOT period acquired via a CAT4 LBT can reduce LBT overheads. Accordingly, the disclosed embodiments may improve spectrum resource utilization efficiency and/or reduce traffic latency. The constraining of a no-LBT-based transmission based on a link switch duration can minimize channel idle time. Accordingly, the disclosed embodiments may reduce the chances of losing the channel occupancy to another node or collisions. The constraining of a no-LBT-based transmission based on a transmission duration before and/or after a link switch can minimize the chances of interference variations during a link switch. Accordingly, the disclosed embodiments may reduce interference in the shared channel. The disclosed embodiments are suitable for use in a network such as an NR-U network deployed over an unlicensed spectrum.

FIG. 1 illustrates a wireless communication network 100 according to some embodiments of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a hand-held device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network through backhaul links (e.g., S1, S2, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as vehicle-to-vehicle (V2V), vehicle-to-everything (V2X), cellular-vehicle-to-everything (C-V2X) communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In an embodiment, the network 100 may operate over a system BW or a component carrier (CC) BW. The network 100 may partition the system BW into multiple BWPs (e.g., portions). ABS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some embodiments, a BS 105 may assign a pair of BWPs within the CC to a UE 115 for UL and DL communications. For example, the BWP pair may include one BWP for UL communications and one BWP for DL communications.

In an embodiment, the network 100 may operate over a shared channel, which may include shared frequency bands or unlicensed frequency bands. For example, the network 100 may be an NR-U network. In such an embodiment, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. For example, a BS 105 may acquire or reserve a TXOP or a channel occupancy time (COT) period in the shared channel by performing a CAT4

LBT. A CAT4 LBT refers to an LBT with a random backoff and a variable contention window. When the LBT passes, the BS 105 may communicate DL traffic to the UE 115 during the acquired COT period. The BS 105 may additionally share the acquired COT period with the UE 115 so that the UE 115 may transmit UL traffic to the BS 105 during the acquired COT period. The sharing of the COT period with the UE 115 can benefit UL traffic that are time-sensitive, such as channel-state-information (CSI) feedbacks and/or hybrid automatic repeat request (HARD) acknowledgement/negative-acknowledgement (ACK/NACK) feedbacks. After the UE 115 completed a UL transmission, the BS 105 may transmit another DL traffic to the UE 115 or another UE 115. In other words, multiple communication link direction switches can occur within the acquired COT period.

After each link direction switch, the interference around a transmitting node may be different from the time when the COT period was initially acquired or from the time when the transmitting node last transmitted. One approach to ensuring that the channel is clear after a link direction switch, the transmitting node may perform a CAT2 LBT prior to transmitting after the link direction switch. A CAT2 LBT refers to an LBT without a random backoff, and thus a CAT2 LBT is more time-efficient than a CAT4 LBT. A CAT2 LBT is also referred to as a one-shot LBT. The UE 115 may perform a CAT2 LBT instead of a CAT4 LBT after the link direction switch since the BS 105 had already acquired or reserved the BS 105's COT period.

According to embodiments of the disclosure, the BS 105 may configure the UE 115 to perform a CAT2 LBT after a link direction switch under certain conditions and may allow the UE 115 to transmit without performing any LBT after a link switch under other conditions. For example, a configuration for determining whether an LBT is required after a link direction switch may be based on a UL/DL switching time duration, a transmission duration before the link switch, a transmission duration after the link switch, a total transmission duration in a certain link direction, a number of link switches within a COT period, a time duration since a last CAT2 LBT or CAT4 LBT is performed in a certain link direction, and/or a transmission data type. Similarly, a UE 115 may acquire or reserve a COT period in a shared channel by performing a CAT4 LBT and share the acquired COT period with the BS 105. The UE 115 may configure rules for the BS 105 to share the UE 115's COT period, for example, indicating whether the BS 105 may use the UE 115's COT period to communicate with another UE 115. Mechanisms for sharing a COT period between a BS 105 and a UE 115 are described in greater detail herein.

Figure 2:
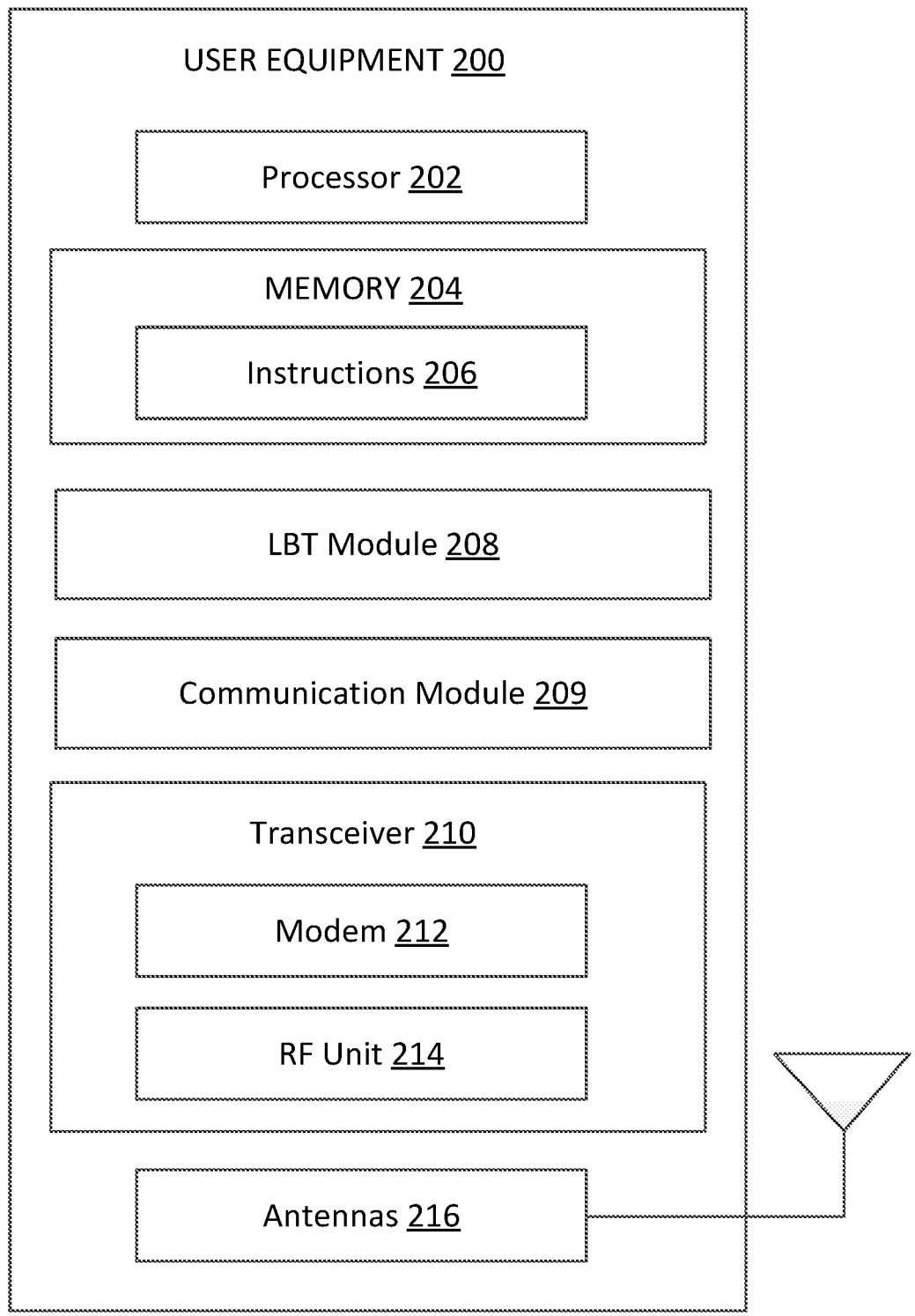
FIG. 2 is a block diagram of a user equipment (UE) according to some embodiments of the present disclosure.

FIG. 2 is a block diagram of an exemplary UE 200 according to embodiments of the present disclosure. The UE 200 may be a UE 115 in the network 100 discussed above in FIG. 1. As shown, the UE 200 may include a processor 202, a memory 204, an LBT module 208, a communication module 209, a transceiver 210 including a modem subsystem 212 and a radio frequency (RF) unit 214, and one or more antennas 216. These elements may be in direct or indirect communication with each other, for example via one or more buses.

The processor 202 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 202 may also be implemented as a combination of computing devices, e.g., a combination of a DSP and a microprocessor, a plurality of microprocessors, one or more microprocessors in conjunction with a DSP core, or any other such configuration.

The memory 204 may include a cache memory (e.g., a cache memory of the processor 202), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 204 includes a non-transitory computer-readable medium. The memory 204 may store instructions 206. The instructions 206 may include instructions that, when executed by the processor 202, cause the processor 202 to perform the operations described herein with reference to the UEs 115 in connection with embodiments of the present disclosure, for example, aspects of FIGS. 4-18. Instructions 206 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

Each of the LBT module 208 and the communication module 209 may be implemented via hardware, software, or combinations thereof. For example, each of the LBT module 208 and the communication module 209 may be implemented as a processor, circuit, and/or instructions 206 stored in the memory 204 and executed by the processor 202. In some examples, the LBT module 208 and/or the communication module 209 can be integrated within the modem subsystem 212. For example, the LBT module 208 and/or the communication module 209 can be implemented by a combination of software components (e.g., executed by a DSP or a general processor) and hardware components (e.g., logic gates and circuitry) within the modem subsystem 212. In some examples, a UE may include the LBT module 208 or the communication module 209. In other examples, a UE may include the LBT module 208 and the communication module 209.

The LBT module 208 and the communication module 209 may be used for various aspects of the present disclosure, for example, aspects of FIGS. 4-18. For example, the LBT module 208 is configured to receive a COT sharing configuration from a BS (e.g., one of the BSs 105) via the communication module 209, determine whether to perform an LBT prior to a UL transmission in a MCOT period of the BS based on the configuration, and/or perform an LBT during the BS's MCOT period based on the determination. The BS's COT sharing configuration includes constraints on transmissions without an LBT after a link direction switch within a MCOT period of the BS. The constraints may be based on a duration of a link switch, a duration of a transmission before a link switch, a duration of a transmission after a link switch, a data type (e.g., control information or data information) or priority (e.g., URLLC) of a transmission after a link switch, and/or a number of link switches in a MCOT period of the BS or between LBTs within the MCOT period.

The LBT module 208 is further configured to perform a CAT4 LBT to acquire or reserve a MCOT period in a shared channel, determine a COT sharing configuration for the BS to share the UE 200's MCOT period with the BS, and/or perform an LBT prior to a UL transmission in the MCOT period based on the UE 200's COT sharing configuration. The UE 200's COT sharing configuration may include similar constraints as the BS's COT sharing configuration and may additionally include rules for the BS to determine whether the BS can share the UE 200's MCOT period for communications with another UE.

The communication module 209 is configured to receive a COT sharing configuration from the BS, receive DL communication signals from the BS during a MCOT period of the UE 200 or a MCOT period of the BS, transmit UL communication signals to the BS during a MCOT period of the UE 200 or a MCOT period of the BS, and/or coordinate with the LBT module 208 for LBTs prior to UL transmissions. Mechanisms for sharing a MCOT period are described in greater detail herein.

As shown, the transceiver 210 may include the modem subsystem 212 and the RF unit 214. The transceiver 210 can be configured to communicate bi-directionally with other devices, such as the BSs 105. The modem subsystem 212 may be configured to modulate and/or encode the data from the memory 204, the LBT module 208, and/or the communication module 209 according to a modulation and coding scheme (MCS), e.g., a low-density parity check (LDPC) coding scheme, a turbo coding scheme, a convolutional coding scheme, a digital beamforming scheme, etc. The RF unit 214 may be configured to process (e.g., perform analog to digital conversion or digital to analog conversion, etc.) modulated/encoded data from the modem subsystem 212 (on outbound transmissions) or of transmissions originating from another source such as a UE 115 or a BS 105. The RF unit 214 may be further configured to perform analog beamforming in conjunction with the digital beamforming. Although shown as integrated together in transceiver 210, the modem subsystem 212 and the RF unit 214 may be separate devices that are coupled together at the UE 115 to enable the UE 115 to communicate with other devices.

The RF unit 214 may provide the modulated and/or processed data, e.g. data packets (or, more generally, data messages that may contain one or more data packets and other information), to the antennas 216 for transmission to one or more other devices. The antennas 216 may further receive data messages transmitted from other devices. The antennas 216 may provide the received data messages for processing and/or demodulation at the transceiver 210. The antennas 216 may include multiple antennas of similar or different designs in order to sustain multiple transmission links. The RF unit 214 may configure the antennas 216.

Figure 3:
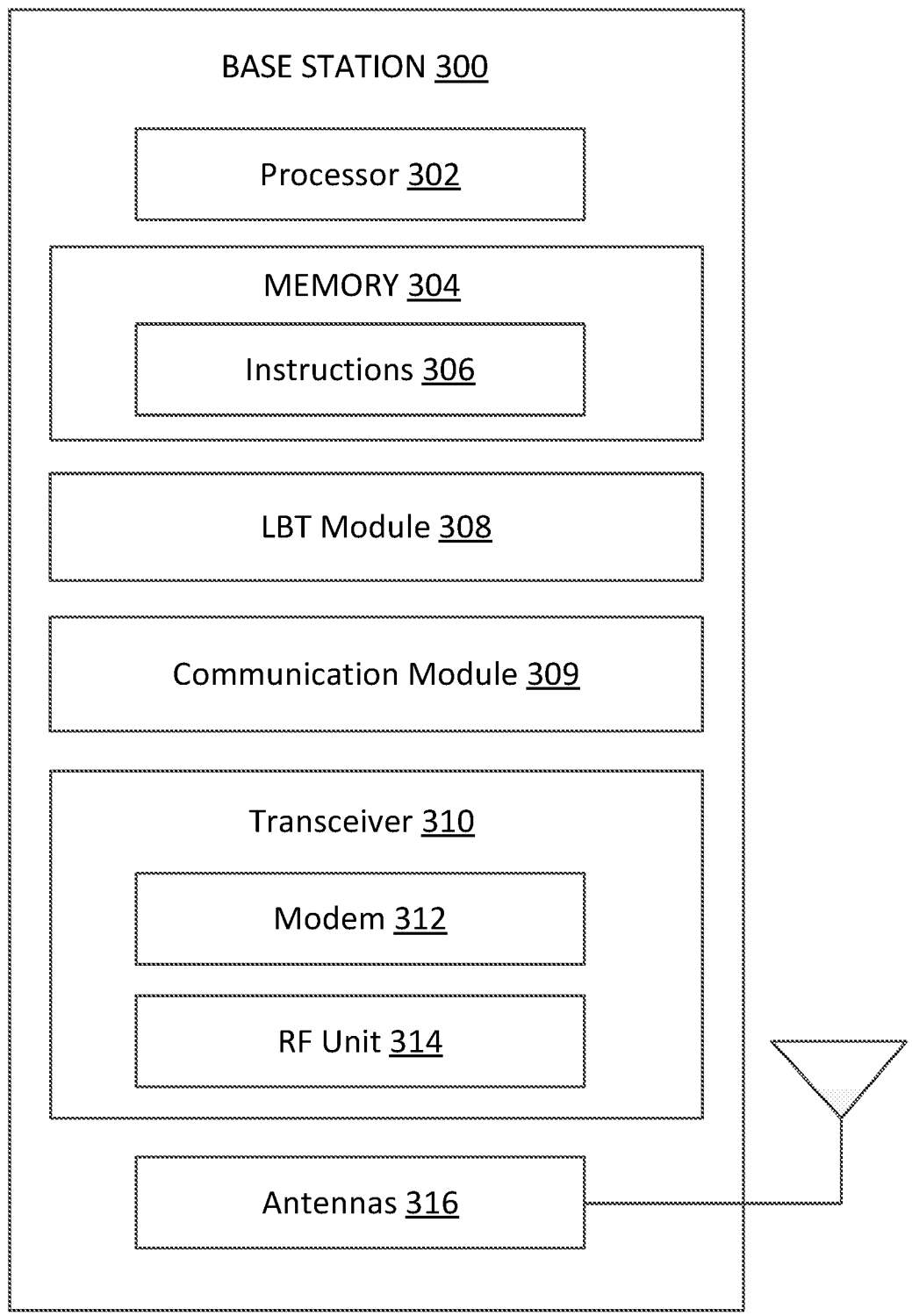
FIG. 3 is a block diagram of an exemplary base station (BS) according to some embodiments of the present disclosure.

FIG. 3 is a block diagram of an exemplary BS 300 according to embodiments of the present disclosure. The BS 300 may be a BS 105 in the network 100 as discussed above in FIG. 1. A shown, the BS 300 may include a processor 302, a memory 304, an LBT module 308, a communication module 309, a transceiver 310 including a modem subsystem 312 and a RF unit 314, and one or more antennas 316. These elements may be in direct or indirect communication with each other, for example via one or more buses.

The processor 302 may have various features as a specific-type processor. For example, these may include a CPU, a DSP, an ASIC, a controller, a FPGA device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 304 may include a non-transitory computer-readable medium. The memory 304 may store instructions 306. The instructions 306 may include instructions that, when executed by the processor 302, cause the processor 302 to perform operations described herein, for example, aspects of FIG. 4-18. Instructions 306 may also be referred to as code, which may be interpreted broadly to include any type of computer-readable statement(s) as discussed above with respect to FIG. 2.

Each of the LBT module 308 and the communication module 309 may be implemented via hardware, software, or combinations thereof. For example, each of the LBT module 308 and the communication module 309 may be implemented as a processor, circuit, and/or instructions 306 stored in the memory 304 and executed by the processor 302. In some examples, the LBT module 308 and/or the communication module 309 can be integrated within the modem subsystem 312. For example, the LBT module 308 and/or the communication module 309 can be implemented by a combination of software components (e.g., executed by a DSP or a general processor) and hardware components (e.g., logic gates and circuitry) within the modem subsystem 312. In some examples, a BS may include the LBT module 308 or the communication module 309. In other examples, a BS may include the LBT module 308 and the communication module 309.

The LBT module 308 and the communication module 309 may be used for various aspects of the present disclosure, for example, aspects of FIGS. 4-18. For example, the LBT module 308 is configured to determine a COT sharing configuration for sharing with a UE (e.g., one of the UEs 115 or 200), perform a CAT4 LBT to acquire or reserve a MCOT period in a shared channel, and/or perform another LBT prior to a UL transmission in the MCOT period based on the BS 300's COT sharing configuration. The BS 300's COT sharing configuration includes constraints on transmissions without an LBT after a link direction switch within a MCOT period of the BS 300. The constraints may be based on a duration of a link switch, a duration of a transmission before a link switch, a duration of a transmission after a link switch, a data type (e.g., control information or data information) or priority (e.g., URLLC) of a transmission after a link switch, and/or a number of link switches in a MCOT period of the BS 300 or between LBTs within the MCOT period.

The LBT module 308 is further configured to receive a COT sharing configuration from a UE (e.g., one of the UEs 115 and 200) via the communication module 309, determine whether to perform an LBT prior to a DL transmission in a MCOT period of the UE based on the configuration, and/or perform an LBT during the UE's MCOT period based on the determination. The UE's COT sharing configuration may include similar constraints as the BS 300's COT sharing configuration and may additionally include rules for determining whether the BS 300 can share the UE's MCOT period for communications with another UE.

The communication module 309 is configured to receive a COT sharing configuration from the UE, transmit DL communication signals to the UE during a MCOT period of the BS 300 or a MCOT period of the UE, receive UL communication signals from UE during a MCOT period of the BS 300 or a MCOT period of the UE, and/or coordinate with the LBT module 308 for LBTs prior to DL transmissions. Mechanisms for sharing a MCOT period are described in greater detail herein.

As shown, the transceiver 310 may include the modem subsystem 312 and the RF unit 314. The transceiver 310 can be configured to communicate bi-directionally with other devices, such as the UEs 115 and/or another core network element. The modem subsystem 312 may be configured to modulate and/or encode data according to a MCS, e.g., a LDPC coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 115 or 200. The RF unit 314 may be further configured to perform analog beamforming in conjunction with the digital beamforming. Although shown as integrated together in transceiver 310, the modem subsystem 312 and/or the RF unit 314 may be separate devices that are coupled together at the BS 105 to enable the BS 105 to communicate with other devices.

The RF unit 314 may provide the modulated and/or processed data, e.g. data packets (or, more generally, data messages that may contain one or more data packets and other information), to the antennas 316 for transmission to one or more other devices. This may include, for example, transmission of information to complete attachment to a network and communication with a camped UE 115 or 200 according to embodiments of the present disclosure. The antennas 316 may further receive data messages transmitted from other devices and provide the received data messages for processing and/or demodulation at the transceiver 310. The antennas 316 may include multiple antennas of similar or different designs in order to sustain multiple transmission links.

FIGS. 4-14 illustrate various mechanisms for constraining no-LBT transmissions after a link direction switch. In FIGS. 4-14, the schemes 400-1400 may be employed by a BS such as the BSs 105 and 300 and a UE such as the UEs 115 and 200 in a network such as the network 100. In particular, a BS may employ the schemes 400, 500, 600, 700, 800, 900, 1000, 1100, 1200, 1300, and/or 1400 to initially acquire a COT or TXOP by performing a CAT4 LBT and share the acquired COT with a UE. Additionally, the x-axes represent time in some constant units.

Figure 4:
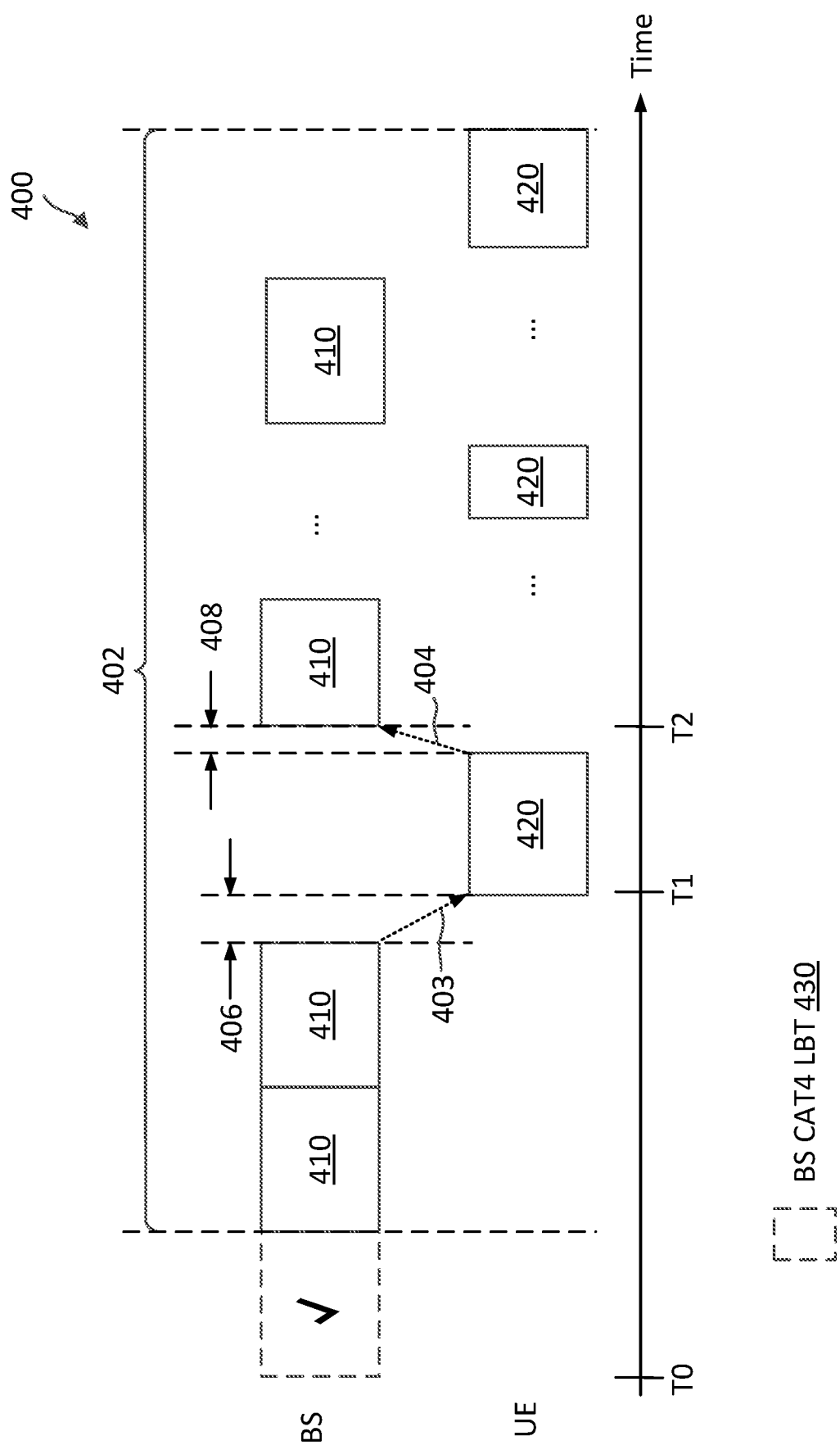
FIG. 4 illustrates a listen-before-talk (LBT) configuration scheme for channel occupancy time (COT) sharing according to some embodiments of the present disclosure.

FIG. 4 illustrates an LBT configuration scheme 400 for COT sharing according to some embodiments of the present disclosure. In the scheme 400, a BS acquires or reserves a MCOT period 402 in a shared medium and allows a UE to transmit during the BS's MCOT period 402 without performing an LBT.

As shown, at time T0, the BS performs a CAT4 LBT 430 in the shared medium. The BS may perform the CAT4 LBT 430 based on energy detection, waveform detection, and/or signal detection. The shared medium or channel may be in a shared frequency spectrum or an unlicensed spectrum. When the CAT4 LBT 430 passes as shown by the checkmark, the BS reserves the medium for a MCOT period 402. The MCOT period 402 refers to the maximum amount of time the BS may use the medium without performing another CAT4 LBT 430. The BS may reserve the medium by transmitting a reservation signal indicating a duration of the MCOT period 402. The reservation signal may include a predetermined sequence and a payload indicating the duration of the MCOT period 402. Alternatively, the reservation signal may include a waveform sequence representing the duration of the MCOT period 402.

During the MCOT period 402, the BS transmits multiple DL communication signals 410, for example, to the UE or another UE, without performing any LBT prior to the transmissions. The DL communication signals 410 can include DL data and/or DL controls. Additionally, the BS shares the MCOT period 402 with the UE. For example, at time T1, after a link direction switch 403 from DL to UL, the UE transmits a UL communication signal 420 to the BS without performing an LBT prior to the transmission. The DL-to-UL switch 403 requires a duration 406, for example, for the BS or the UE to switch a frontend between a transmit mode to a receive mode. The UL communication signals 420 can include UL data and/or UL controls. Similarly, at time T2, after a link direction switch 404 from UL to DL, the BS may transmit another DL communication signal 410. The DL-to-UL switch 403 spans a duration 406. The UL-to-DL switch 404 spans a duration 408. For example, the durations 406 and 408 allows time for the BS or the UE to switch a frontend between a transmit mode to a receive mode.

In the context of LTE or NR, the DL data signal, the DL control signal, the UL data signal, and the UL control signal may be referred to as PDSCH, PDCCH, PUSCH, and PUCCH, respectively. In an embodiment, a DL control signal may include UL scheduling grant for the UE. The BS may configure the UE with a no LBT mode for link switches via an RRC configuration, a group common PDCCH DCI (e.g., for all UEs), and/or a UE-specific PDCCH DCI (e.g., including a UL scheduling grant with the no LBT mode). In an embodiment, the UL control signal may include hybrid automatic repeat request (HARD) acknowledgement/negative-acknowledgements (ACK/NACKs) for DL data, scheduling requests (SRs), and/or channel quality indicators (CQIs). The UL controls can be timing-sensitive and can include a small data size. Accordingly, by allowing the UE to transmit the UL communication signals 420 within the MCOT period 402 without performing an LBT prior to the UL transmissions can improved spectrum resource utilization efficiency and reduce traffic latency or delay metric.

While FIG. 4 illustrates four DL communication signals 410 and three UL communication signals 420 communicated in the MCOT period 402, the BS and the UE may communicate any suitable number of DL communication signals 410 and UL communication signals 420 with multiple link switches (e.g., about 2, 3, 4, 5, 6, 7, 8, 9, or more) from UL to DL and from DL to UL within the BS's MCOT period 402.

In an embodiment, the BS may configure the UE with a no LBT mode via an RRC configuration and/or PDCCH.

Figure 5:
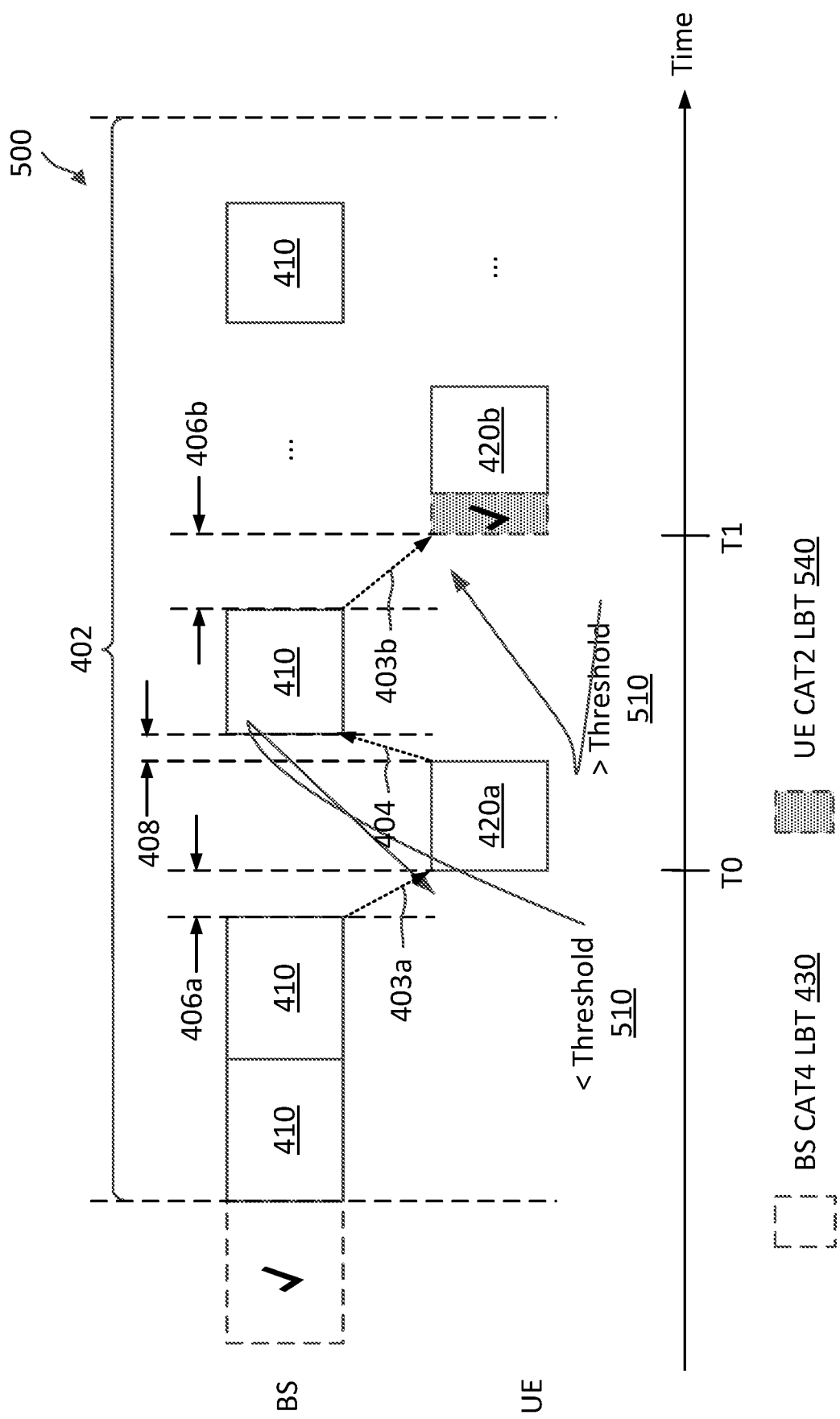
FIG. 5 illustrates an LBT configuration scheme for COT sharing according to some embodiments of the present disclosure.

FIG. 5 illustrates an LBT configuration scheme 500 for COT sharing according to some embodiments of the present disclosure. The scheme 500 is described using a similar MCOT structure as in the scheme 400 where a BS performs a CAT4 LBT 430 to reserve or acquire a MCOT period 402, and may use the same reference numerals as in FIG. 4 for simplicity sake. In the scheme 500, the BS configures a UE to perform a CAT2 LBT after a link switch when a link switch duration 406 within the MCOT period 402 exceeds a certain threshold 510. In other words, a CAT2 LBT is required when the channel is left idle for a certain period of time. The link switch duration threshold 510 can be set to any suitable duration. In some embodiments, the link switch duration threshold 510 can be set to about 16 microseconds (μs).

As shown, at time T0, the link switch duration 406a (for the DL-to-UL switch 403a) is below the threshold 510.

Thus, the UE transmits a UL communication signal 420a without performing an LBT. However, at time T1, the link switch duration 406b (for the DL-to-UL switch 403b) exceeds the threshold 510. Thus, the UE performs a CAT2 LBT 540. When the CAT2 LBT 540 passes as shown by the checkmark, the UE transmits a UL communication signal 420b to the BS. If the CAT2 LBT 540 fails, the UE may refrain from transmitting. A link switch duration (e.g., the link switch durations 406a and 406b and 408) may vary due to various factors, for example, based on the duration and/or the packet type of a packet before the link switch and/or the types of the link switch (e.g., DL-to-UL or DL-to-UL).

While not shown, the BS may also perform a CAT2 LBT when a UL-to-DL switch duration 408 exceeds a threshold (e.g., the same as the threshold 510 or different from the threshold 510) and may transmit without performing any LBT when a UL-to-DL switch duration 408 is equal to or below the threshold.

In an embodiment, the BS may configure the UE with the link switch duration threshold 510 via an RRC configuration, a group common PDCCH (GC-PDCCH) DCI (e.g., for all UEs), and/or a UE-specific PDCCH DCI (e.g., including a UL scheduling grant with the no LBT mode).

Figure 6:
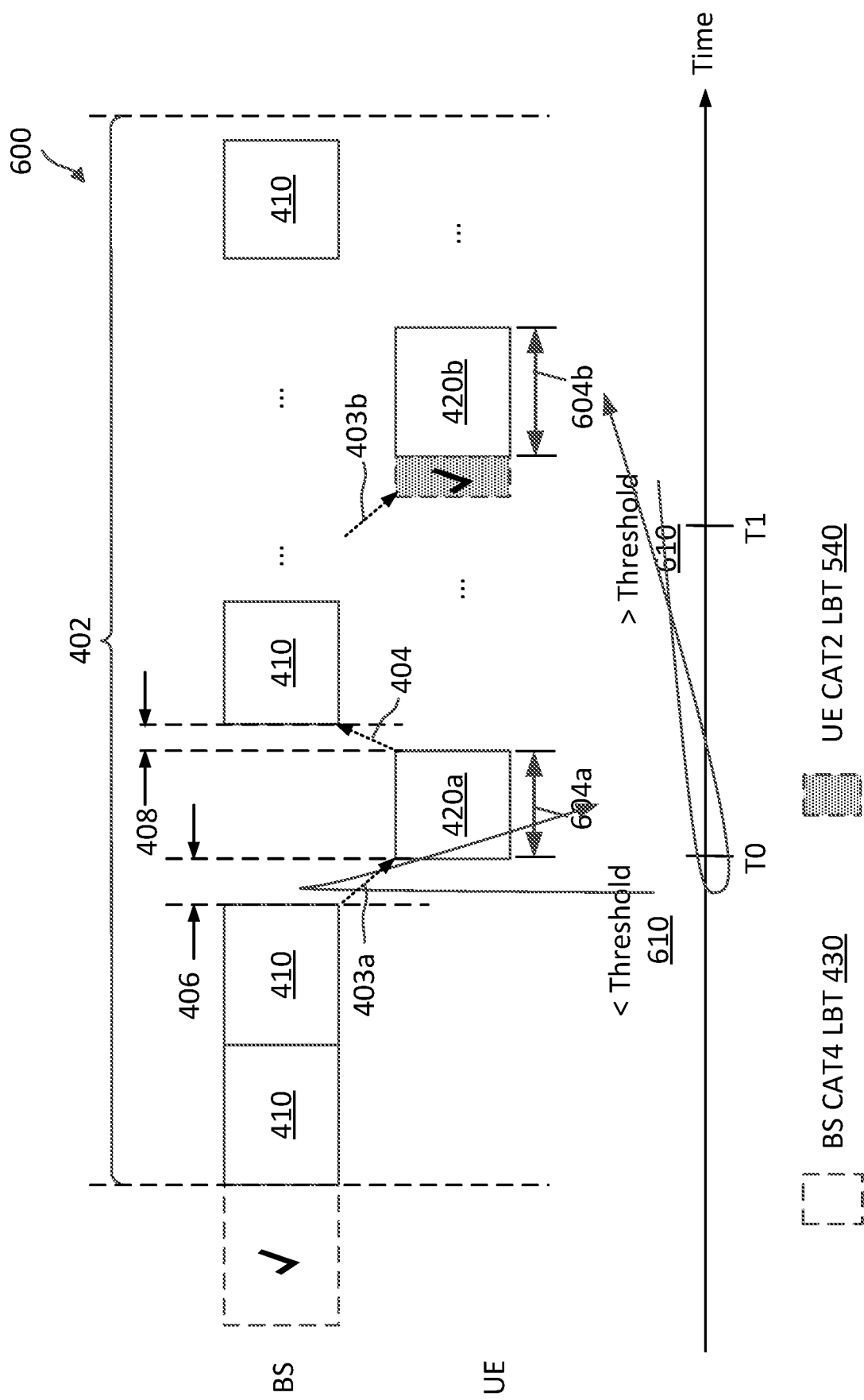
FIG. 6 illustrates an LBT configuration scheme for COT sharing according to some embodiments of the present disclosure.

FIG. 6 illustrates an LBT configuration scheme 600 for COT sharing according to some embodiments of the present disclosure. The scheme 600 is described using a similar MCOT structure as in the scheme 400 where a BS performs a CAT4 LBT 430 to reserve or acquire a MCOT period 402, and may use the same reference numerals as in FIG. 4 for simplicity sake. In the scheme 600, the BS configures a UE to perform a CAT2 LBT after a link switch in the MCOT period 402 when the UE plans to transmit an UL communication signal 420 with a duration longer than a certain threshold 610. In other words, a UE may determine whether to perform a CAT2 LBT or no LBT based on a duration of the UE's transmission after the link switch. The transmission duration threshold 610 can be set to any suitable duration. In some embodiments, the transmission duration threshold 610 can be set to about 0.5 millisecond (ms), about 1 ms, or about 1.5 ms.

As shown, at time T0, the UE transmits a UL communication signal 420a without performing an LBT since a transmission duration 604a of the UL communication signal 420a after the link switch 403a is equal to or below the threshold 610. However, at time T1, the UE performs a CAT2 LBT 540 prior to transmitting a UL communication signal 420b since a transmission duration 604b of the UL communication signal 420b after the link switch 403b exceeds the threshold 610.

While not shown, the BS may also perform a CAT2 LBT when a transmission duration of a BS's transmission after a UL-to-DL switch 404 may exceed a threshold (e.g., the same as the threshold 610 or different from the threshold 610) and may transmit without performing any LBT when a transmission duration of a BS's transmission after a UL-to-DL switch 404 may be equal to or below the threshold.

In an embodiment, the BS may configure the UE with the transmission duration threshold 610 via an RRC configuration and/or PDCCH DCI.

Figure 7:
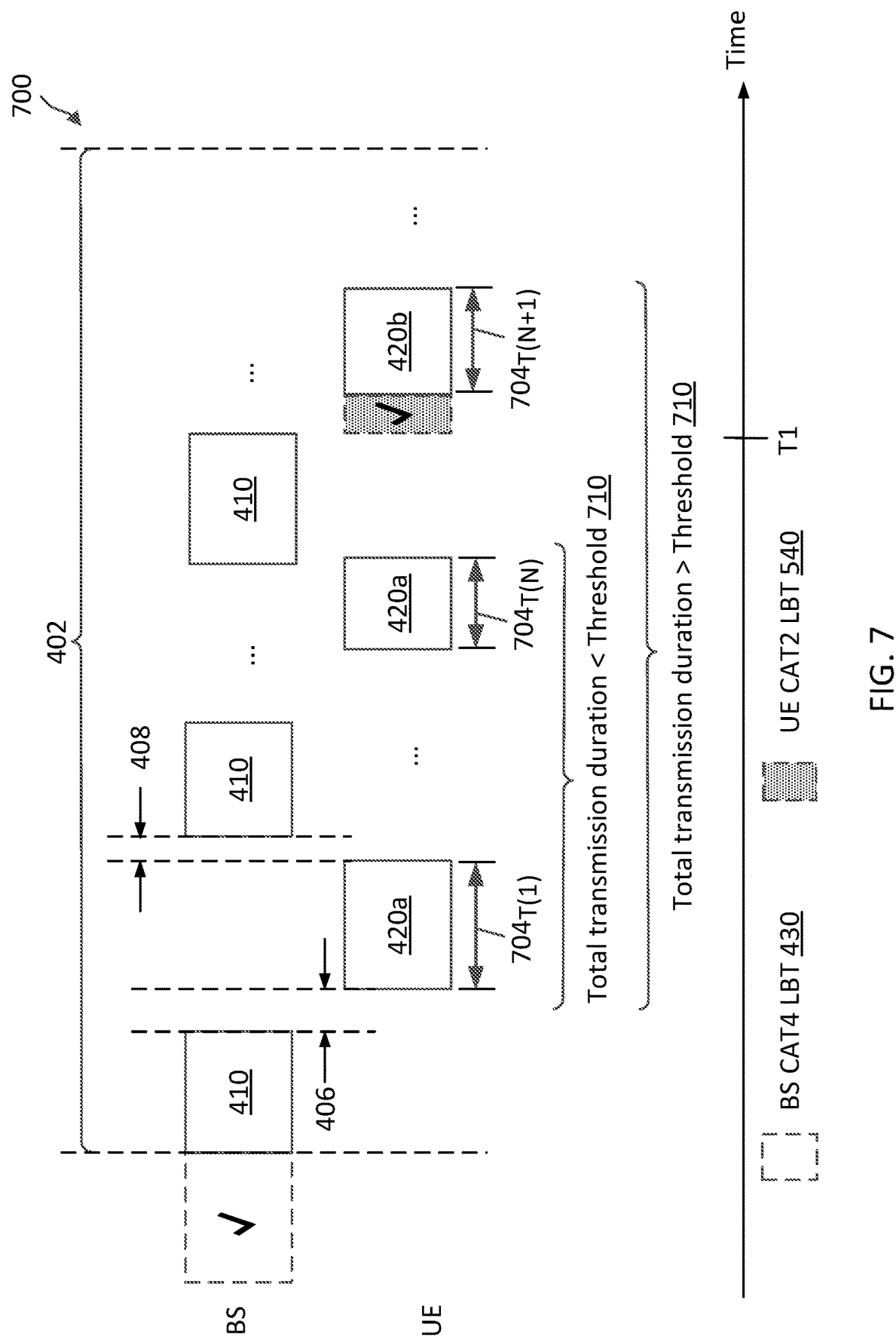
FIG. 7 illustrates an LBT configuration scheme for COT sharing according to some embodiments of the present disclosure.

FIG. 7 illustrates an LBT configuration scheme 700 for COT sharing according to some embodiments of the present disclosure. The scheme 700 is described using a similar MCOT structure as in the scheme 400 where a BS performs a CAT4 LBT 430 to reserve or acquire a MCOT period 402, and may use the same reference numerals as in FIG. 4 for simplicity sake. The scheme 700 is substantially similar to the scheme 600, but the BS may configure the UE with a total transmission duration threshold 710 instead of a per switch transmission duration threshold 610 as in the scheme 600. In other words, the scheme 700 allows a UE to transmit without performing an LBT for a certain period of time. The total transmission duration threshold 710 can be set to any suitable duration. In some embodiments, the total transmission duration threshold 710 can be set to about 1 ms, about 2 ms, or about 3 ms.

As shown, the UE transmits multiple UL communication signal 420a (e.g., multiple UL bursts) in the MCOT period 402 without performing an LBT after a link switch until a total transmission duration in the UL direction exceeds the threshold 710. The total transmission duration is computed as a sum of the per switch transmission duration of $704_{T(1)}$ to $704_{T(N)}$. At time T1, the UE performs a CAT2 LBT 540 prior to transmitting a UL communication signal 420b since the total transmission duration including the upcoming UL communication signal 420b (sum of $704_{T(1)}$ to $704_{T(N+1)}$) in the UL direction exceeds the threshold 710.

While the scheme 700 illustrates a UE-specific total transmission duration threshold, in some embodiments, the BS may configure a common total transmission duration threshold. In other words, the BS may limit a total UL transmission duration from all UEs without an LBT within the MCOT period 402 of the BS.

In an embodiment, the BS may configure one or more UEs with the total transmission duration threshold 710 via an RRC configuration and/or GC-PDCCH DCI.

Figure 8:
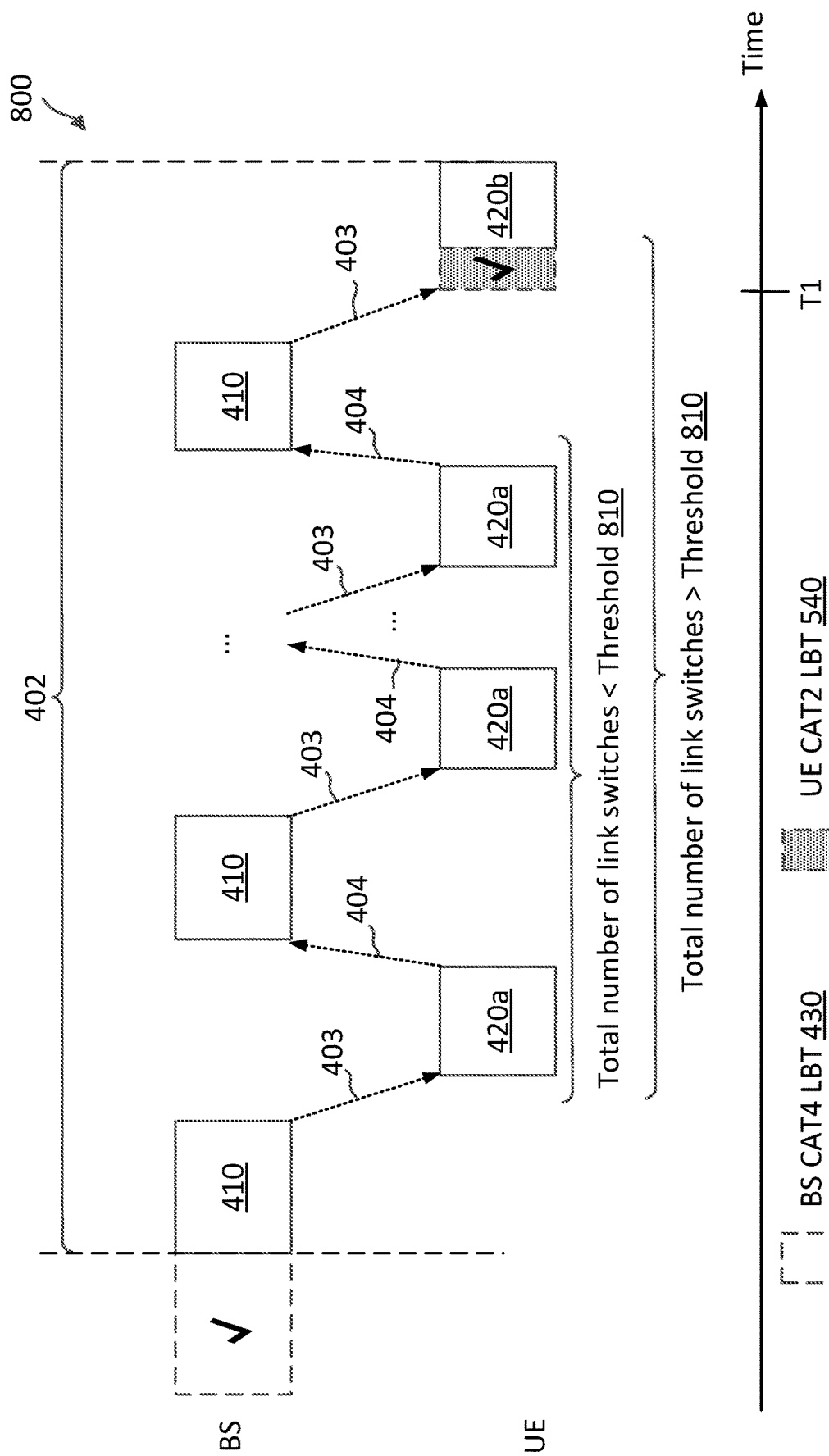
FIG. 8 illustrates an LBT configuration scheme for COT sharing according to some embodiments of the present disclosure.

FIG. 8 illustrates an LBT configuration scheme 800 for COT sharing according to some embodiments of the present disclosure. The scheme 800 is described using a similar MCOT structure as in the scheme 400 where a BS performs a CAT4 LBT 430 to reserve or acquire a MCOT period 402, and may use the same reference numerals as in FIG. 4 for simplicity sake. In the scheme 800, the BS configures a UE to perform a CAT2 LBT after number of link switches exceeds a certain threshold 810. The number of link switch threshold 810 can be set to any suitable duration. In some embodiments, the number of link switch threshold 810 can be set to about 3, about, 4, about 5 or more.

As shown, the UE transmits multiple UL communication signal 420a in the MCOT period 402 without performing an LBT after a link switch until a total number of link switches exceeds the threshold 810. The total number of link switches refers to a total number of DL-to-UL switches 403 and UL-to-DL switches 404. At time T1, after the total number of link switches exceeded the threshold 810, the UE performs a CAT2 LBT 540 prior to transmitting a UL communication signal 420b. In an example, the total number of link switches 403 and 404 may refer to the total number of link switches 403 and 404 in the MCOT period 402 as shown. In another example, the total number of link switches 403 and 404 may refer to the total number of link switches 403 and 404 since a last LBT 540 is performed. In other words, the BS can limit the total number of link switches between LBTs 540.

In an embodiment, the number of link switch threshold 810 can be increased after the UE perform the CAT2 LBT 540. Alternatively, the counting of the total number of link switches can be reset after the UE perform the CAT2 LBT 540.

While not shown, the BS may also perform a CAT2 LBT when a total number of link switches (e.g., the number of DL-to-UL switches 403 and UL-to-DL switches 404) exceeds a threshold (e.g., same as the threshold 810 or different from the threshold 810) and may transmit without performing any LBT when a transmission duration of a UE's transmission immediately before a UL-to-DL switch is equal to or below the threshold.

While the scheme 800 illustrates a total number of link switch threshold 810 for a specific UE, in some embodiments, the BS may configure a common total number of link switch threshold for multiple UEs served by the BS. In other words, the BS may limit a total number of link switches that the BS uses for communicating with the multiple UEs without an LBT within the MCOT period 402 of the BS.

In an embodiment, the BS may configure the UE with the maximum number of link switch threshold 810 via an RRC configuration, UE-specific PDCCH DCI, and/or GC-PDCCH DCI.

In an embodiment, the BS may apply a combination of total number of link switches, per switch transmission duration (as shown in the scheme 600), and a total transmission duration (as shown in the scheme 700) to limit transmissions without LBTs within a MCOT period 402 of the BS. For example, the BS may allow the UE to transmit without an LBT in the MCOT period 402 when the number of link switches is below the threshold 810, the UE's per switch UL transmission duration is below the threshold 610, and/or the UE's total UL transmission duration is below the threshold 710.

Figure 9:
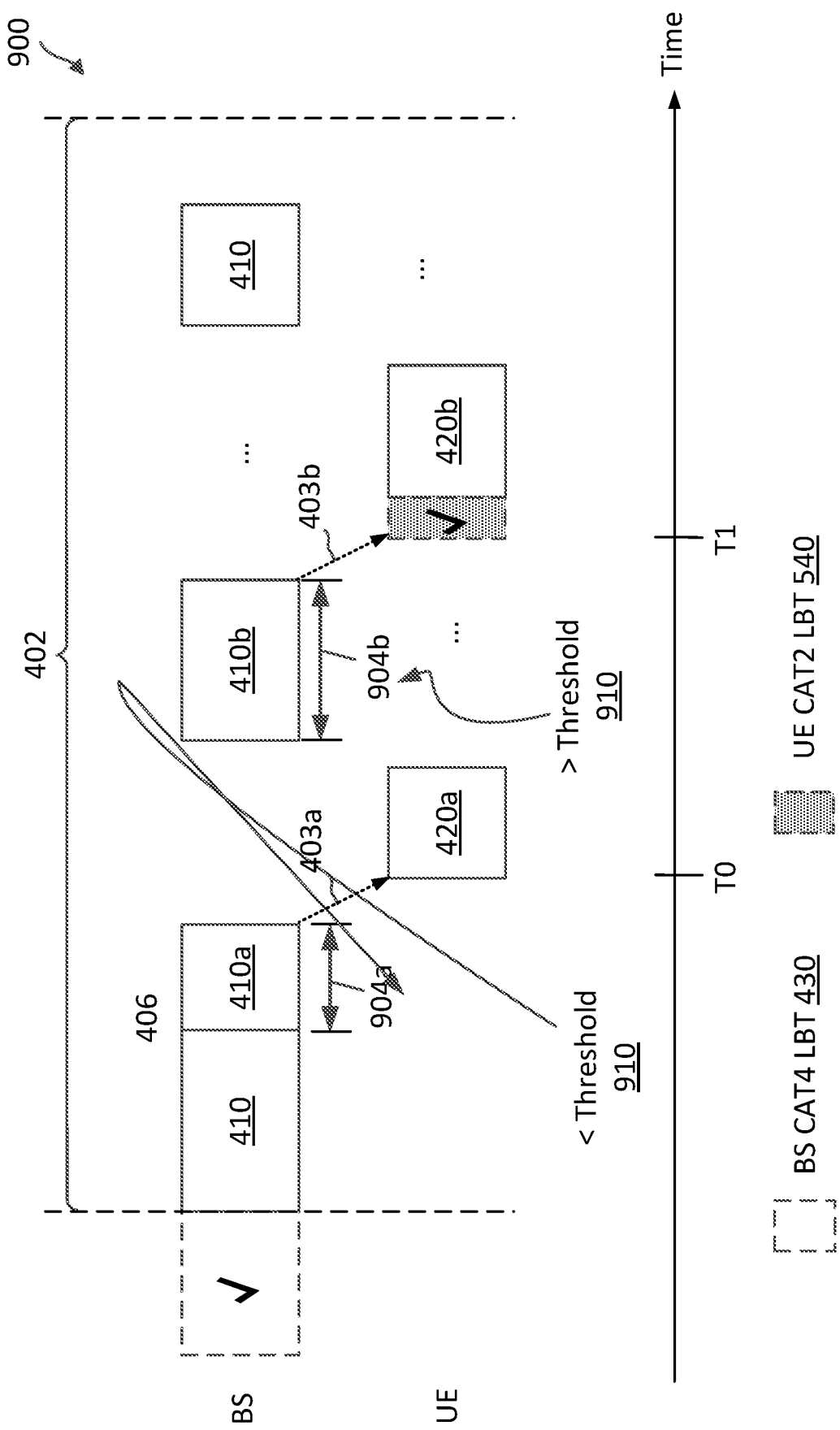
FIG. 9 illustrates an LBT configuration scheme for COT sharing according to some embodiments of the present disclosure.

FIG. 9 illustrates an LBT configuration scheme 900 for COT sharing according to some embodiments of the present disclosure. The scheme 900 is described using a similar MCOT structure as in the scheme 400 where a BS performs a CAT4 LBT 430 to reserve or acquire a MCOT period 402, and may use the same reference numerals as in FIG. 4 for simplicity sake. In the scheme 900, the BS configures a UE to perform a CAT2 LBT after a link switch when a transmission duration of one or more DL transmissions immediately before the link switch is greater than a certain threshold 910. In other words, a UE may determine whether to perform a CAT2 LBT or no LBT based on a transmission duration of in the DL before the link switch. The transmission duration threshold 910 can be set to any suitable duration. In some embodiments, the transmission duration threshold 910 can be set to about 1 ms, about 2 ms, or about 3 ms.

As shown, at time T0, after a DL-to-UL switch 403a the UE transmits a UL communication signal 420a without performing an LBT since a transmission duration 904a of a DL communication signal 410a immediately before the DL-to-UL switch 403a is below the threshold 910. However, at time T1, after a DL-to-UL switch 403b, the UE performs a CAT2 LBT 540 prior to transmitting a UL communication signal 420b since a transmission duration 904b of a DL communication signal 410a before the DL-to-UL switch 403b exceeds the threshold 910.

While not shown, the BS may also perform a CAT2 LBT when a transmission duration of a UE's transmission immediately before a UL-to-DL switch exceeds a threshold (e.g., the same as the threshold 910 or different from the threshold 910) and may transmit without performing any LBT when a transmission duration of a UE's transmission immediately before a UL-to-DL switch is equal to or below the threshold.

In an embodiment, the BS may configure one or more UEs with the transmission duration threshold 910 via an RRC configuration and/or PDCCH DCI.

Figure 10:
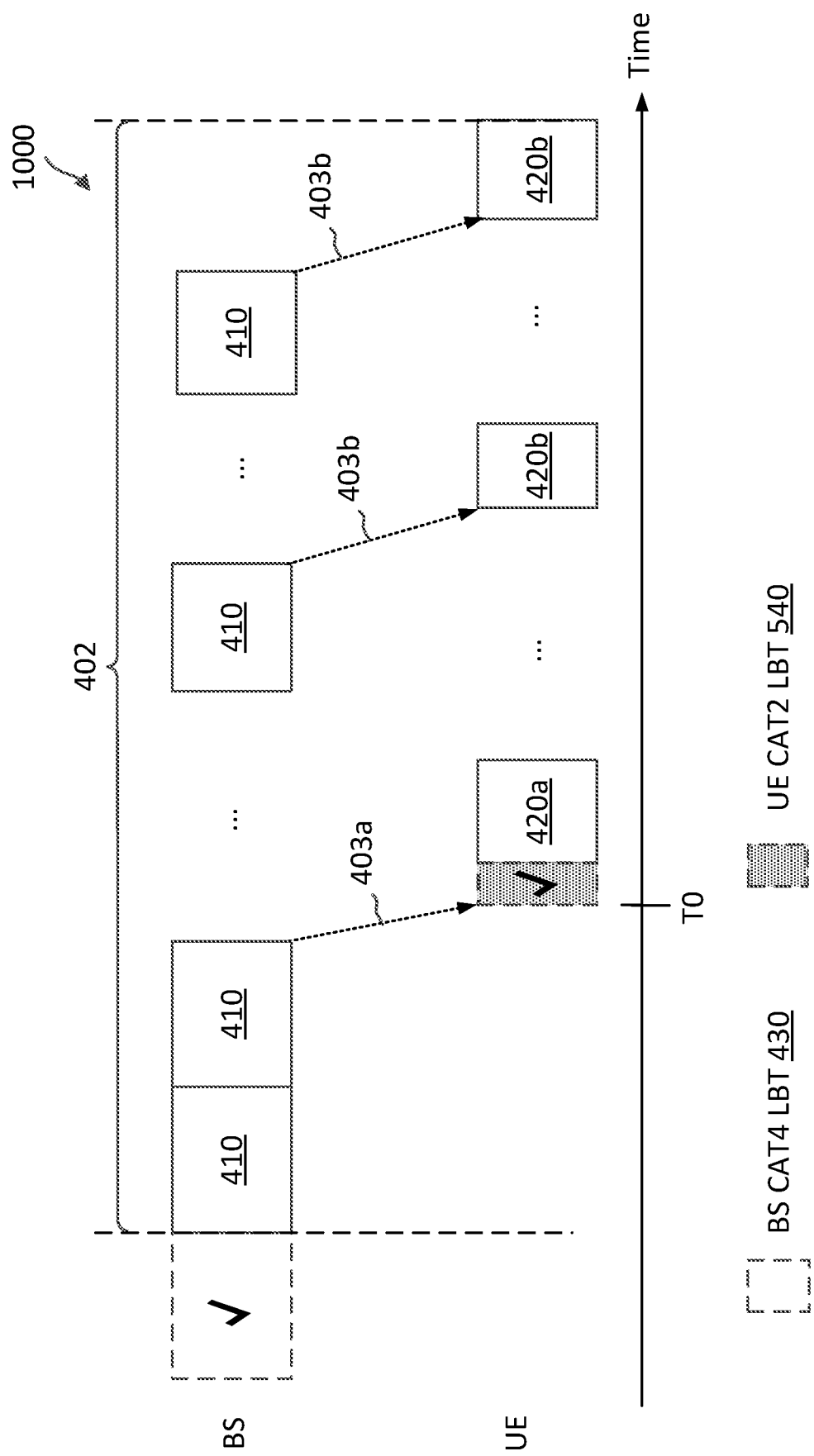
FIG. 10 illustrates an LBT configuration scheme for COT sharing according to some embodiments of the present disclosure.

FIG. 10 illustrates an LBT configuration scheme 1000 for COT sharing according to some embodiments of the present disclosure. The scheme 1000 is described using a similar MCOT structure as in the scheme 400 where a BS performs a CAT4 LBT 430 to reserve or acquire a MCOT period 402, and may use the same reference numerals as in FIG. 4 for simplicity sake. In the scheme 1000, the BS configures a UE to perform a CAT2 LBT after an initial link switch during a MCOT period 402 of the BS and allows the UE to transmit without performing an LBT in subsequent link switches within MCOT period 402.

As shown, at time T0, after an initial DL-to-UL switch 403a in the MCOT period 402, the UE performs a CAT2 LBT 540 prior to transmitting a UL communication signal 420a. In subsequent DL-to-UL switches 403b, the UE transmits a UL communication signal 420b without performing an LBT.

In an embodiment, the BS may configure the UE with a CAT2 LBT mode for a first link switch in a MCOT period 402 of the BS and a no LBT mode for subsequent link switches in the MCOT period 402 via an RRC configuration, UE-specific PDCCH DCI, and/or GC-PDCCH DCI.

In an embodiment, the BS may apply a combination of a link switch time duration threshold (e.g., the threshold 510), one or more transmission duration thresholds (e.g., the thresholds 610, 710, and/or 910), and/or a number of link switch threshold (e.g., the threshold 810) in conjunction with the scheme 900 to constrain transmissions without LBTs within a MCOT period 402 of the BS. For example, the BS may require the UE to perform a CAT2 LBT 540 after a link switch when the above thresholds are not met and may allow the UE to transmit without performing an LBT after passing the CAT2 LBT 540.

Figure 11:
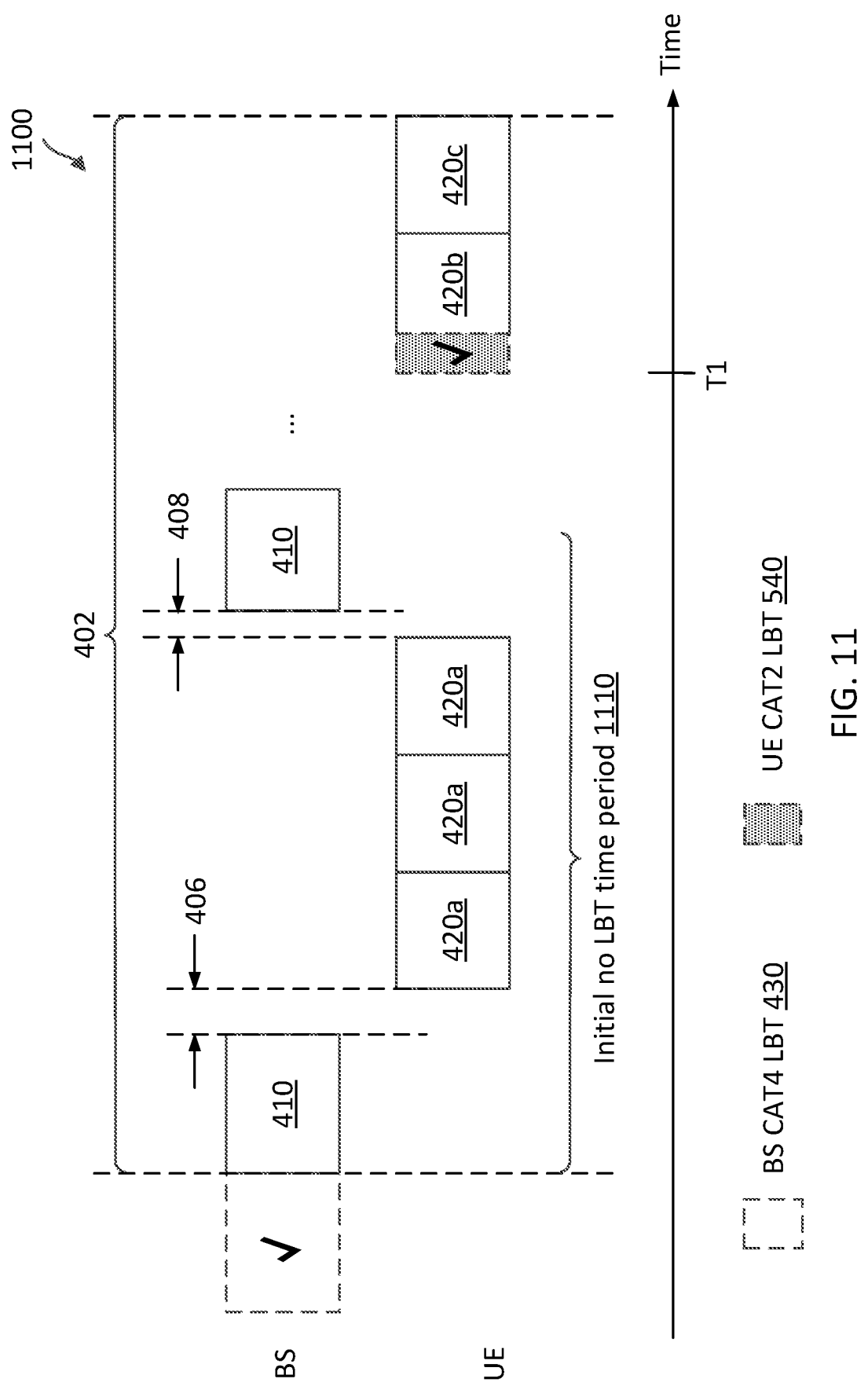
FIG. 11 illustrates an LBT configuration scheme for COT sharing according to some embodiments of the present disclosure.

FIG. 11 illustrates an LBT configuration scheme 1100 for COT sharing according to some embodiments of the present disclosure. The scheme 1100 is described using a similar MCOT structure as in the scheme 400 where a BS performs a CAT4 LBT 430 to reserve or acquire a MCOT period 402, and may use the same reference numerals as in FIG. 4 for simplicity sake. In the scheme 1100, the BS configures the UE with a no LBT mode for an initial time period 1110 within the MCOT period 402 and requires the UE to perform a single CAT2 LBT for the remaining duration of the MCOT period 402. The initial no LBT time period 1110 can include any suitable duration. In some embodiments, the initial no LBT time period 1110 can include a duration of about 2 ms, about 3 ms, or about 4 ms.

As shown, at time the UE transmits multiple UL communication signal 420a (e.g., multiple UL burst) in the MCOT period 402 without performing an LBT before the end of the initial no LBT time period 1110. At time T1, after the initial no LBT time period 1110, the UE performs a CAT2 LBT 540 prior to transmitting a UL communication signal 420b and subsequently a UL communication.

In an embodiment, the BS may configure the UE with the initial no LBT time period 1110 via an RRC configuration and/or PDCCH DCI.

Figure 12:
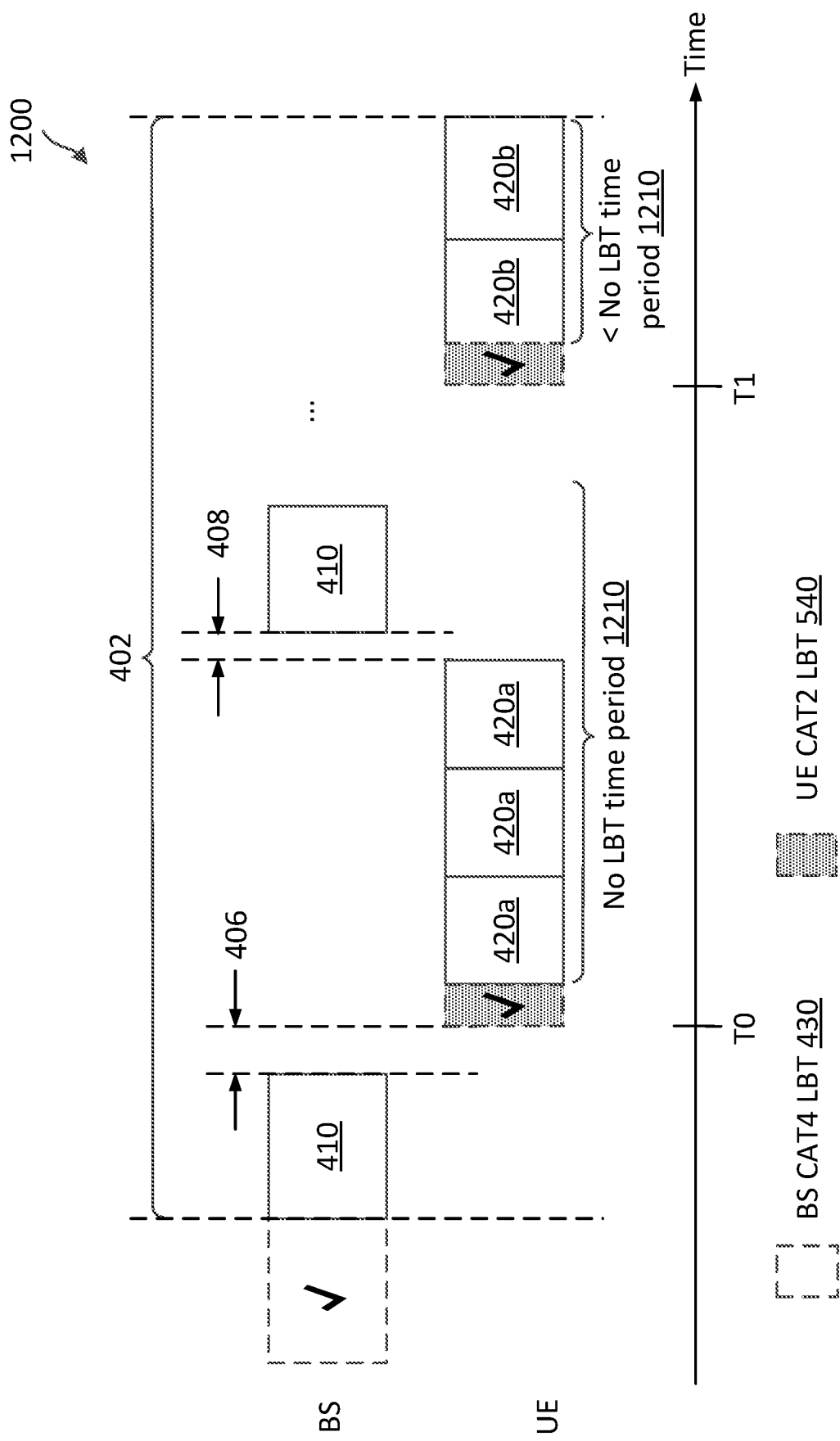
FIG. 12 illustrates an LBT configuration scheme for COT sharing according to some embodiments of the present disclosure.

FIG. 12 illustrates an LBT configuration scheme 1200 for COT sharing according to some embodiments of the present disclosure. The scheme 1200 is described using a similar MCOT structure as in the scheme 400 where a BS performs a CAT4 LBT 430 to reserve or acquire a MCOT period 402, and may use the same reference numerals as in FIG. 4 for simplicity sake. In the scheme 1200, the BS allows a UE to transmit in the MCOT period 402 without performing an LBT for a no LBT time period 1210 after performing a CAT4 LBT or a CAT2 LBT. The no LBT time period 1210 can include any suitable duration. In some embodiments, the no LBT time period 1210 can include a duration of about 1 ms, about 2 ms, or about 3 ms.

As shown, at time T0, the UE performs a CAT2 LBT 540. When the CAT2 LBT 540 passes as shown by the checkmark, the UE transmits multiple UL communication signals 420*a* without performing another CAT2 LBT 540. At time T1, after the no LBT time period 1210, the UE performs another CAT2 LBT 540 and transmits multiple UL communication signals 420*b* without performing another CAT2 LBT 540.

In an embodiment, the BS may configure the UE with the no LBT time period 1210 via an RRC configuration and/or PDCCH DCI.

Figure 13:
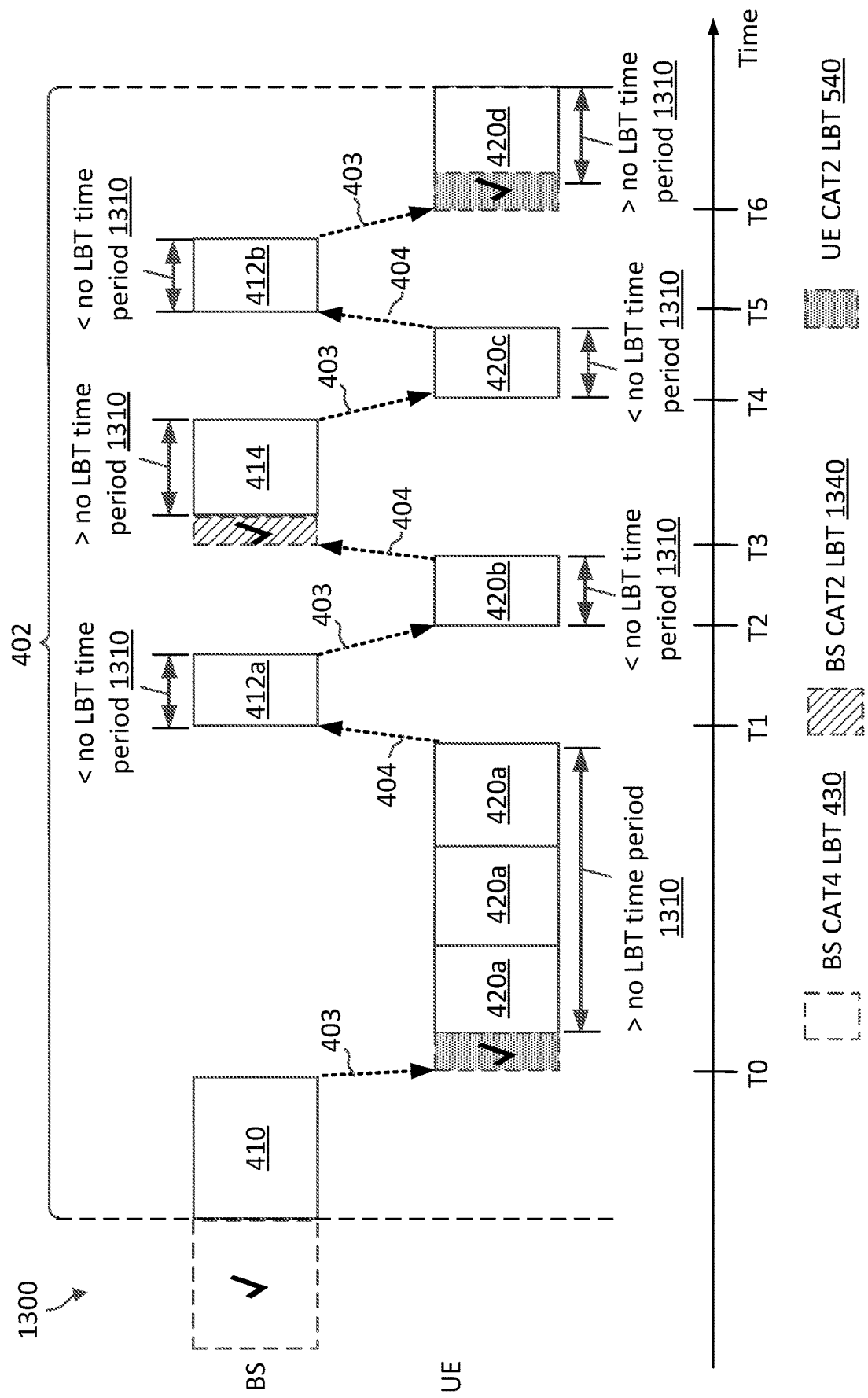
FIG. 13 illustrates an LBT configuration scheme for COT sharing according to some embodiments of the present disclosure.

FIG. 13 illustrates an LBT configuration scheme 1300 for COT sharing according to some embodiments of the present disclosure. The scheme 1300 is described using a similar MCOT structure as in the scheme 400 where a BS performs a CAT4 LBT 430 to reserve or acquire a MCOT period 402, and may use the same reference numerals as in FIG. 4 for simplicity sake. The scheme 1300 allows a node (e.g., a BS or a UE) to transmit after a link switch without performing an LBT if the node had previously performed a CAT2 LBT or a CAT4 LBT and a transmission in the other link direction immediately before the link switch has a duration that is less than a no LBT time period 1310. The scheme 1300 additionally allows a node to transmit after a link switch in the MCOT period 402 without performing an LBT if the node is going to transmit in the medium for a duration less than the no LBT time period 1310. The scheme 1300 further allows a node to transmit after a link switch in the MCOT period 402 without performing an LBT if the node is going to transmit control information (e.g., a short packet). Thus, the scheme 1300 does not restrict the node with a maximum no LBT time period as long as the other node does not transmit in the other link direction for a duration longer than the no LBT time period 1310 before a link switch and/or the node does not transmit for a duration longer than the no LBT time period 1310 after a link switch. The no LBT time period 1310 can include any suitable duration. In some embodiments, the no LBT time period 1310 can include a duration of about 0.5 ms, about 1 ms, or about 1.5 ms.

As shown, at time T0, after a DL-to-UL switch 403, the UE performs a CAT2 LBT 540. When the CAT2 LBT 540 passes as shown by the checkmark, the UE transmits multiple UL communication signals 420*a* without performing another CAT2 LBT 540.

At time T1, after a UL-to-DL switch 404, the BS transmits a DL control signal 412*a* (e.g., a PDCCH carrying DCI) without performing an LBT based on the DL control signal 412*a* including control information and/or the DL control signal 412*a* having a duration less than the no LBT time period 1310.

At time T2, after a DL-to-UL switch 403, the UE transmits a UL communication signal 420*b* without performing an LBT based on the previous DL control signal 412*a* having a duration shorter than the no LBT time period 1310.

At time T3, after a UL-to-DL switch 404, the BS performs a CAT2 LBT 1340 prior to transmitting a DL data signal 414 (e.g., a PDSCH carrying DL data) based on the DL data signal 414 including data information and/or the DL data signal 414 having a duration longer than the no LBT time period 1310.

At time T4, after a DL-to-UL switch 403, the UE transmits a UL communication signal 420*c* without performing an LBT based on the UL communication signal 420*c* having a duration shorter than the no LBT time period 1310.

At time T5, after a UL-to-DL switch 404, the BS transmits another DL control signal 412*b* without performing an LBT based on the DL control signal 412*b* including control information and/or the DL control signal 412*b* having a duration less than the no LBT time period 1310.

At time T6, after a DL-to-UL switch 403, the UE performs a CAT2 LBT 540 prior transmitting a UL communication signal 420*d* based on the UL communication signal 420*d* having a duration longer than the no LBT time period 1310.

As can be observed, the COT is effectively transferred to a node after the node performed a successful LBT and the original owner loses the COT. For example, the COT is transferred from the BS to the UE after the UE passes the CAT2 LBT 540 at time T0. Similarly, the COT is transferred from the UE back to the BS after the BS passes the CAT2 LBT 1340 at time T3. The COT is again transferred from the BS to the UE after the UE passes the CAT2 LBT 540 at time T6. The transferring of the COT is defined in terms of LBT options or modes (e.g., no LBT or CAT2 LBT), and not in terms for transmission duration restriction. In other words, if the previous owner (the node that performed a CAT2 LBT or a CAT4 LBT) of the COT wants to transmit, the node may transmit without performing an LBT provided the transmission duration is short. Alternatively, the node can have the COT transferred back to the node by performing a CAT2 LBT or a CAT4 LBT. In an embodiment, a UE may detect that the BS performed a CAT2 LBT prior to a DL transmission by monitoring for channel reservation information (e.g., in DCI) from the BS. Similarly, a BS may detect that the UE performed a CAT2 LBT prior to a UL transmission by monitoring for channel reservation information (e.g., in UCI) from the UE.

Figure 14:
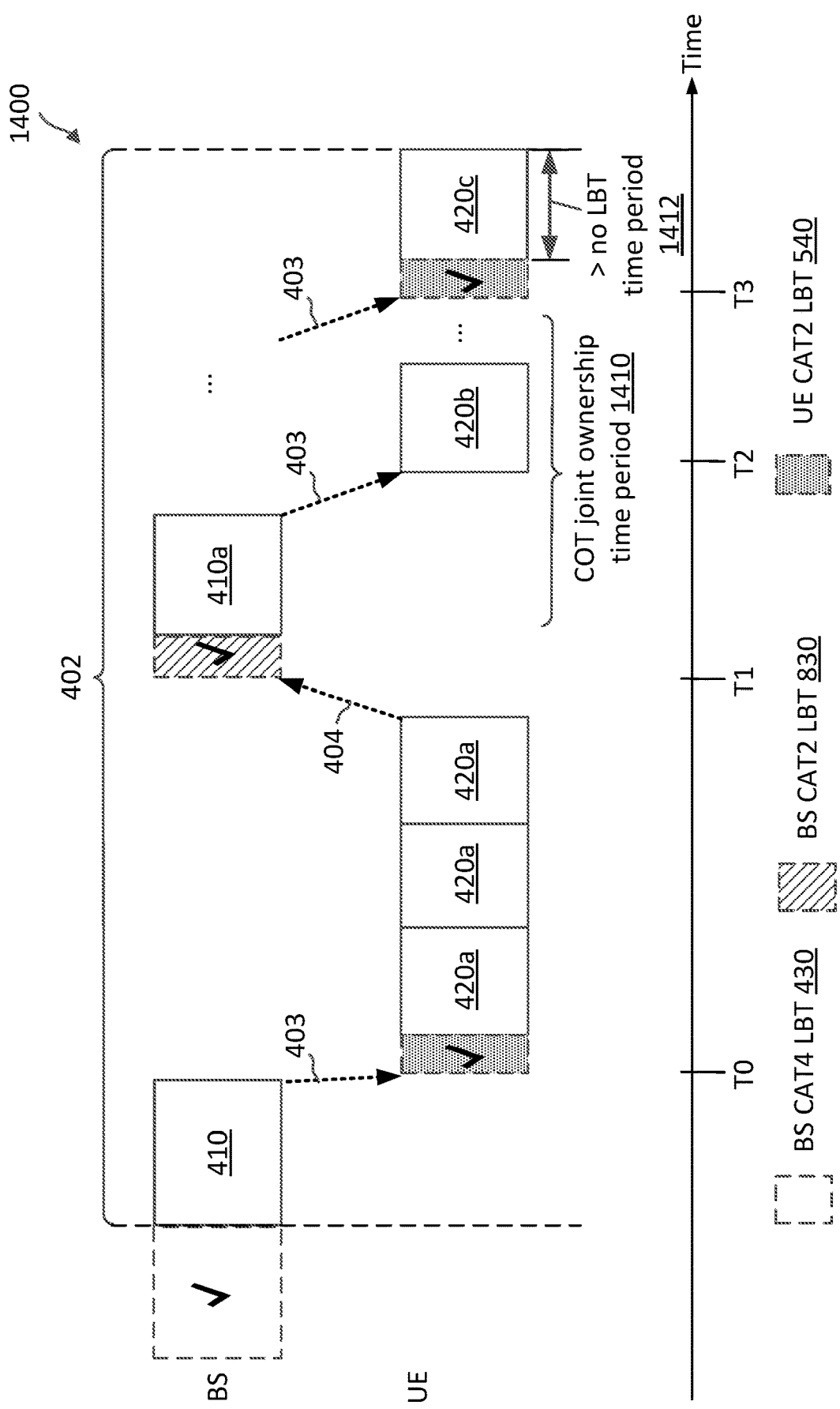
FIG. 14 illustrates an LBT configuration scheme for COT sharing according to some embodiments of the present disclosure.

FIG. 14 illustrates an LBT configuration scheme 1400 for COT sharing according to some embodiments of the present disclosure. The scheme 1400 is described using a similar MCOT structure as in the scheme 400 where a BS performs a CAT4 LBT 430 to reserve or acquire a MCOT period 402, and may use the same reference numerals as in FIG. 4 for simplicity sake. The scheme 1400 is substantially similar to the scheme 1300 where the ownership of a COT is transferred to the node that performed a successful LBT (e.g., CAT2 LBT or CAT4 LBT). However, the COT is jointly owned by the original node for a time period 1410 after the transfer instead of the original node losing the COT ownership immediately after the transfer. As such, the original node may transmit within the COT joint ownership time period 1410 without performing an LBT and without considering any transmission duration restriction as in the scheme 1300. However, the original node is required to consider a transmission duration outside of the COT joint ownership time period 1410 as the original node no longer owns the COT, As shown, at time T0, after a DL-to-UL switch 403, the UE performs a CAT2 LBT 540. When the CAT2 LBT 540 passes as shown by the checkmark, the UE owns the COT and transmits multiple UL communication signals 420*a* without performing another CAT2 LBT 540.

At time T1, after a UL-to-DL switch 404, the BS performs a CAT2 LBT 1340. When the CAT2 LBT 1340 passes, the BS owns the COT and transmits a DL communication signal 410. The COT is jointly owned by the UE for the time period 1410. Thus, at time T2, after a DL-to-UL switch 403, the UE may transmit a UL communication signal 420*b* without performing an LBT within the time period 1410 irrespective of a duration of the UL communication signal 420*b*.

At time T3, after a DL-to-UL switch 403 outside of the time period 1410, the UE is required to perform a CAT2 LBT 540 before transmitting a UL communication signal 420*c* having a duration longer than the no LBT time period 1412 (e.g., the no LBT time period 1310).

Figure 15:
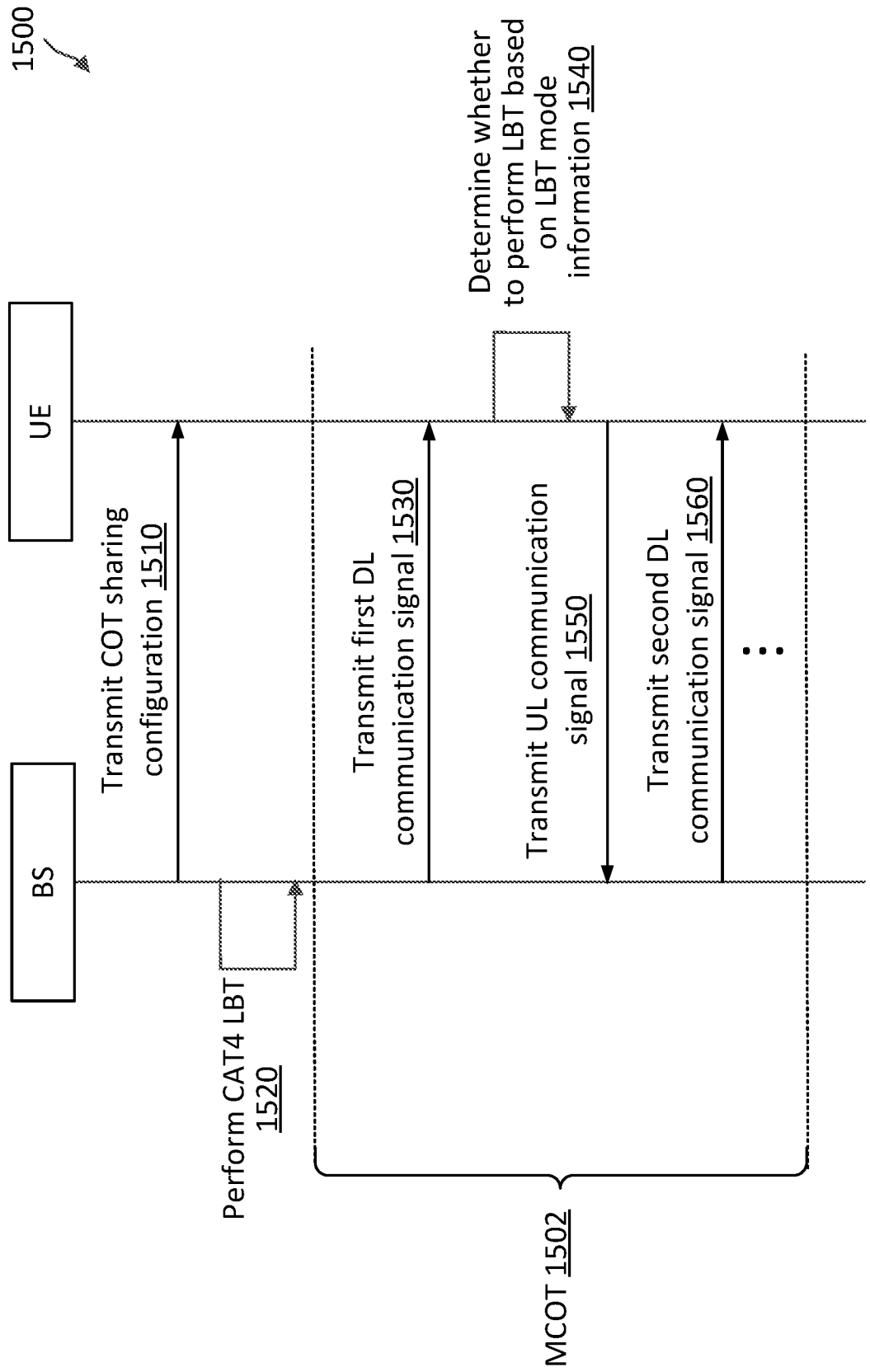
FIG. 15 is a signaling diagram illustrating a communication method with COT sharing according to some embodiments of the present disclosure.

FIG. 15 is a signaling diagram illustrating a communication method 1500 with COT sharing according to some embodiments of the present disclosure. The method 1500 is implemented between a BS (e.g., the BSs 105 and 300) and a UE (e.g., the UEs 115 and 200) in a network (e.g., the network 100) for communications over a frequency spectrum (e.g., a shared spectrum or an unlicensed spectrum) shared by multiple entities. Steps of the method 1500 can be executed by computing devices (e.g., a processor, processing circuit, and/or other suitable component) of the BS and the UE. As illustrated, the method 1500 includes a number of enumerated steps, but embodiments of the method 1500 may include additional steps before, after, and in between the enumerated steps. In some embodiments, one or more of the enumerated steps may be omitted or performed in a different order. The method 1500 may employ any suitable combinations of the schemes 400, 500, 600, 700, 800, 900, 1000, 1100, 1200, 1300, and 1400 described above with respect to FIGS. 4, 5, 6, 7, 8, 9, 10, 11, 12, 13, and 14, respectively.

At step 1510, the BS transmits a COT sharing configuration to the UE. The COT sharing configuration indicates rules for determining when a no-LBT-based transmission is allowed in a MCOT period (e.g., the MCOT periods 402) of the BS. The rules can be UE-specific and/or common for all UEs. The BS may transmit the COT sharing configuration via an RRC message, a PDCCH DCI (e.g., UE-specific constraints), and/or a GC-PDCCH DCI (e.g., common constraints for all UEs). The BS may define the rules by employing any suitable combinations of the schemes 400-1400 described above with respect to FIGS. 4-14.

In an embodiment, the rules may constraint a no-LBT-based transmission after a link switch (e.g., the DL-to-UL switches 403) within a BS's MCOT period based on a duration of the link switch, a duration of a transmission before the link switch, a duration of a transmission after the link switch, a data type (e.g., control information or data information), data priority (e.g., feedback information and/or URLLC) of a transmission after the link switch, and/or a number of link switches within the BS's MCOT period. For example, the rules can indicate various thresholds, such as the link switch duration threshold 510, the transmission duration thresholds 610, 710, and/or 910, the no LBT time periods 1310 and 1412, and the number of link switch threshold 810.

In an embodiment, the rules may restrict an amount of time for no-LBT-based transmission in a BS's MCOT period. For example, the rules can indicate the initial no LBT time period 1110 and 1210 and the COT joint ownership time period 1410.

In an embodiment, the rules may indicate a no LBT mode for all UE's transmissions within at least some of the BS's MCOT periods.

In an embodiment, the rules may indicate that a UE is not allowed to share at least some of the BS's MCOT periods or at least a duration of a BS's MCOT period, for example, due to a BSs broadcast schedule for transmissions of discovery signals (DRS), such as SSBs including synchronization information and/or system information.

At step 1520, the BS performs a CAT4 LBT (e.g., the CAT4 LBTs 430) in a shared channel. For example, the CAT4 LBT is a pass and the BS reserves or acquires a MCOT period 1402 (e.g., the MCOT periods 402) in the channel.

At step 1530, the BS transmit a first DL communication signal (e.g., the DL communication signals 410, and the DL control signals 412, and DL data signals 414) in the MCOT period 1502. The first DL communication signal may include a UL scheduling grant including a resource allocation (e.g., time-frequency resources) and/or a transmission configuration (e.g., MCS) for the UE. In some instances, the UL scheduling grant can also indicate a LBT mode for the UE's transmission.

At step 1540, upon receiving the UL scheduling grant, the UE determines whether to perform an LBT (e.g., the CAT2 LBTs 540) prior to transmitting based on the received COT sharing configuration and/or the UL scheduling grant. In some examples, the UE may determine whether to perform an LBT before transmitting the UL communication signal based on a transmission duration of the first DL communication signal, a transmission duration of the UL communication signal, a switching time from DL to UL, the data type or priority carried in the UL communication signal, the number of link switches that had already occurred in the MCOT period 1402. When an LBT is required based on the rules, the UE performs a CAT2 LBT and proceeds to the step 1550 when the CAT2 LBT passes. When no LBT is required based on the rules, the UE proceeds to the step 1550.

At step 1550, the UE transmits a UL communication signal to the BS based on the UL scheduling grant.

At step 1560, the BS transmits a second DL communication signal. In an example, the BS may transmit the second DL communication signal without performing an LBT since the BS has acquired the MCOT period 1402. In some examples, the BS may determine whether to perform an LBT before transmitting the second DL communication signal, for example, based on a transmission duration of the UL communication signal, a transmission duration of the second DL communication signal, a switching time from UL to DL, and/or the data type or data priority carried in the second DL communication signal.

Figure 16:
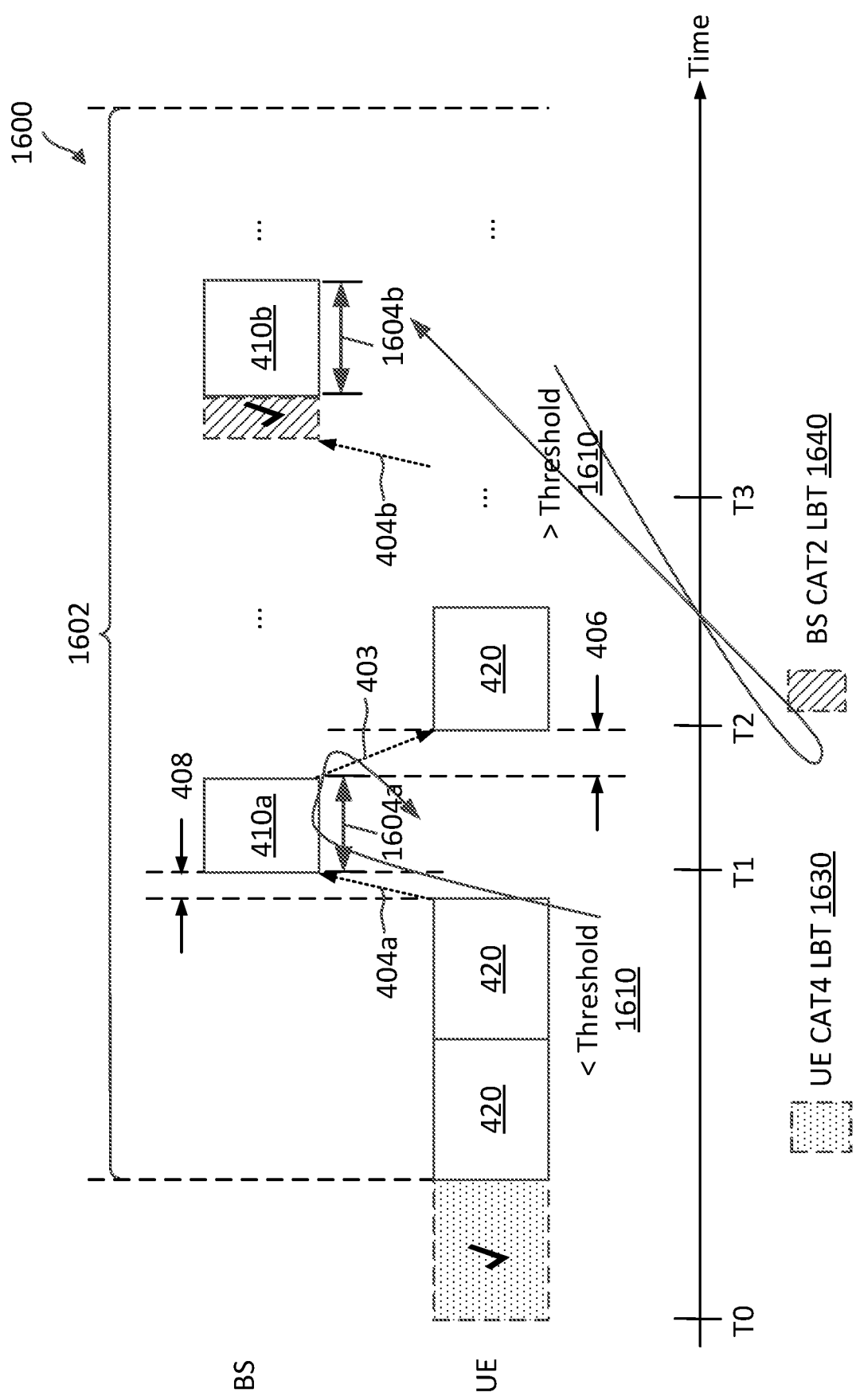
FIG. 16 illustrates an LBT configuration scheme for sharing a UE acquired MCOT period according to some embodiments of the present disclosure.

FIG. 16 illustrates an LBT configuration scheme 1600 for COT sharing according to some embodiments of the present disclosure. The scheme 1600 may be employed by a BS such as the BSs 105 and 300 and a UE such as the UEs 115 and 200 in a network such as the network 100. In particular, a UE may employ the scheme 1600 to initially acquire a COT or TXOP by performing a CAT4 LBT and share the acquired COT with a BS. In FIG. 16, the x-axis represents time in some constant units. In the scheme 1600, a UE acquires or reserves a MCOT period 1602 in a shared medium and allows a BS to transmit DL communications during the UE's MCOT period 1602. The scheme 1600 may apply any suitable combinations of the schemes 400-1400 described above with respect to FIGS. 4-14 to share the MCOT period 1602 with the BS. For simplicity of illustration and discussion, FIG. 16 illustrates a constraint on a transmission duration after a link switch (e.g., the UL-to-DL switches 404). For example, the UE may allow the BS to transmit without performing an LBT when a transmission duration after a UL-to-DL switch is less than a certain threshold 1610. Additionally, FIG. 16 is described using a similar UL-to-DL and DL-to-UL switch structure as in FIG. 4, and may use the same reference numerals as in FIG. 4 for simplicity sake.

As shown, at time T0, the UE performs a CAT4 LBT 1630 in a shared medium. The shared medium or channel may be in a shared frequency spectrum or an unlicensed spectrum. When the CAT4 LBT 1630 passes as shown by the checkmark, the UE reserves the medium for a MCOT period 1602. The MCOT period 1602 refers to the maximum amount of time the UE may use the medium without another CAT4 LBT 1630. The UE may reserve the medium by transmitting a reservation signal indicating a duration of the MCOT period 1602. The reservation signal may include a predetermined sequence and a payload indicating the duration of the MCOT period 1602. Alternatively, the reservation signal may include a waveform sequence representing the duration of the MCOT period 1602. In some embodiments, the UE may indicate in a UL control signal (e.g., via UCI in a PUCCH) timing information associated with the MCOT period 1602, constraints for no-LBT-based transmissions from the BS in the MCOT period 1602, and/or rules for determining whether a BS is allowed to schedule other UEs in the MCOT period 1602.

During the MCOT period 1602, the UE transmits multiple UL communication signals 420, for example, to the BS without performing any LBT prior to the transmissions since the UE acquired the MCOT period 1602 with a CAT4 LBT 1630. Additionally, the UE shares the MCOT period 1602 with the BS. For example, at time T1, the BS transmits a DL communication signal 410a without performing an LBT since a transmission duration 1604a of the DL communication signal 410a after a UL-to-DL switch 404a is below the threshold 1610.

At time T2, after a DL-to-UL switch 403, the UE transmits another UL communication signal 420 to the BS without performing an LBT prior to the transmission since the UE acquired the MCOT period 1602 with a CAT4 LBT 1630.

At time T3, the BS performs a CAT2 LBT 1340 prior to transmitting a DL communication signal 410b since a transmission duration 1604b of the DL communication signal 410b after a UL-to-DL switch 404b exceeds the threshold 1610.

Figure 17:
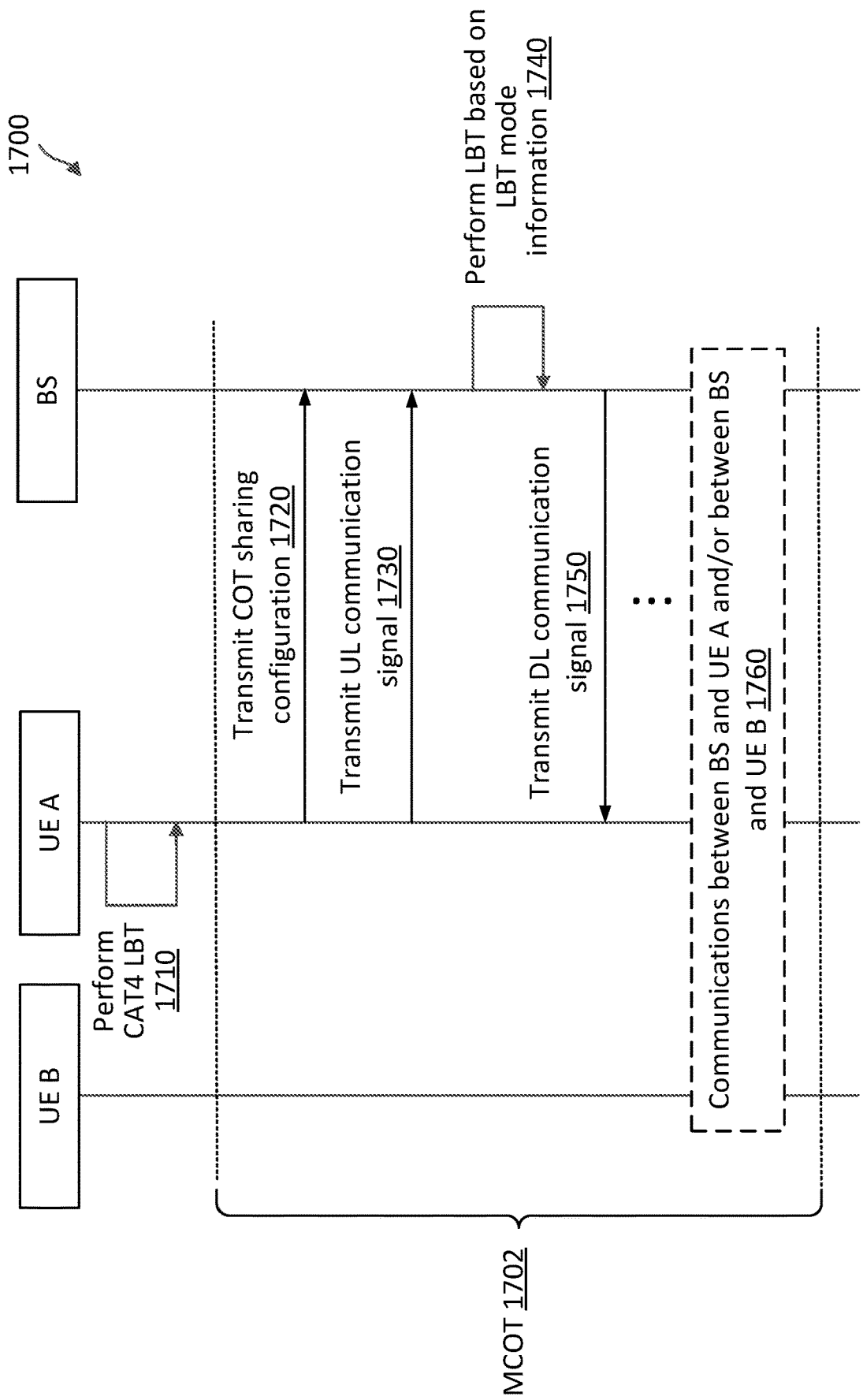
FIG. 17 is a signaling diagram illustrating a communication method with COT sharing according to some embodiments of the present disclosure.

FIG. 17 is a signaling diagram illustrating a communication method 1700 with COT sharing according to some embodiments of the present disclosure. The method 1700 is implemented between a BS (e.g., the BSs 105 and 300) and a UE A and a UE B (e.g., the UEs 115 and 200) in a network (e.g., the network 100) for communications over a frequency spectrum (e.g., a shared spectrum or an unlicensed spectrum) shared by multiple entities. Steps of the method 1700 can be executed by computing devices (e.g., a processor, processing circuit, and/or other suitable component) of the BS and the UE. As illustrated, the method 1700 includes a number of enumerated steps, but embodiments of the method 1700 may include additional steps before, after, and in between the enumerated steps. In some embodiments, one or more of the enumerated steps may be omitted or performed in a different order. The method 1700 may employ similar mechanisms in the schemes 400, 500, 600, 700, 800, 900, 1000, 1100, 1200, 1300, 1400, and 1600 described above with respect to FIGS. 4, 5, 6, 7, 8, 9, 10, 11, 12, 13, 14, and 16, respectively.

At step 1710, the UE A performs a CAT4 LBT (e.g., the CAT4 LBTs 1630) in a shared channel. For example, the CAT4 LBT is a pass and the UE reserves or acquires a MCOT period 1702 (e.g., the MCOT periods 402, 1502 and 1602) in the channel.

At step 1720, the UE A transmits COT sharing configuration to the UE. The COT sharing configuration indicates rules for determining when a no-LBT-based transmission is allowed in the MCOT period 1702 of the UE A. The UE A may transmit the COT sharing configuration via uplink control information (UCI) in a PUCCH. The UE A may define the rules by employing any suitable combinations of the schemes 400-1400 described above with respect to FIGS. 4-14.

In an embodiment, the rules may constraint a no-LBT-based transmission after a link switch (e.g., the UL-to-DL switches 404) within the MCOT period 1702 based on a duration of the link switch, a duration of a transmission before the link switch, a duration of a transmission after the link switch, a data type (e.g., control information or data information) or priority (e.g., URLLC) of a transmission after the link switch, and/or a number of link switches within the MCOT period 1702. For example, the rules can indicate various thresholds, such as the link switch duration threshold 510, the transmission duration thresholds 610, 710, and/or 910, the no LBT time periods 1310 and 1412, and the number of link switch threshold 810.

In an embodiment, the rules may restrict an amount of time for no-LBT-based transmission in the MCOT period 1702. For example, the rules can indicate a no-LBT allowable time period, such as the initial no LBT time period 1110 and 1210 and the COT joint ownership time period 1410.

In an embodiment, the COT sharing configuration may indicate an LBT mode and an LBT outcome used by the UE to acquire the MCOT period 1702. The COT sharing configuration may indicate per subband LBT mode and LBT outcome. For example, the network may operate over a certain system bandwidth and the system bandwidth can be divided into multiple subbands, where the UE may perform the CAT4 LBT in each subband.

In an embodiment, the COT sharing configuration may indicate that the BS may not share the MCOT period 1702 to schedule DL communications (e.g., data and/or control) with other UEs in the network. In an embodiment, the COT sharing configuration may indicate that the BS may share the MCOT period 1702 to for broadcast communications (e.g., SSBs, PBCH signals, MIBs, SIBs, and paging) with other UEs (e.g., the UE B), but not UE-specific communications (e.g., unicast) with other UEs.

In an embodiment, the COT sharing configuration may indicate that the BS may share the MCOT period 1702 to schedule DL communications (e.g., data and/or control) with other UEs, but with certain constraints. In an example, the COT sharing configuration may indicate that the BS is allowed to schedule another UE in the MCOT period 1702, but limited to certain types of transmissions, such as PUCCH and/or high priority PUSCH. In an example, the COT sharing configuration may indicate that the BS is allowed to schedule another UE in the MCOT period 1702, but limited to a certain transmission duration (e.g., shorter than a certain threshold). In an example, the COT sharing configuration may indicate that the BS is allowed to schedule another UE in the MCOT period 1702, but limited to the same time schedule or same time domain resources as the UE A. In an example, the COT sharing configuration may indicate that the BS is required to perform a CAT2 LBT after an initial link switch in the MCOT period 1702. In an example, the COT sharing configuration may indicate that the BS is allowed to schedule another UE in the MCOT period 1702, but limited to after the BS performing a CAT2 LBT (e.g., transferring the COT from the UE to the BS).

At step 1730, the UE transmit a UL communication signal (e.g., the UL communication signals 420) in the MCOT period 1702. The UL communication signal can include UL control (e.g., HARQ ACK/NACK, SR, and/or CQI) and/or UL data.

At step 1740, the BS determines whether to perform an LBT (e.g., the CAT2 LBT 1640) prior to transmitting a DL communication signal based on the received COT sharing configuration. When an LBT is required based on the COT sharing configuration, the BS performs a CAT2 LBT and proceeds to the step 1750 when the CAT2 LBT passes. When no LBT is required based on the rules, the BS proceeds to the step 1750.

At step 1750, the BS transmits a DL communication signal to the UE. The DL communication signal can include DL control (e.g., UL scheduling grants and/or DL scheduling grants for the UE) and/or DL data for the UE.

At step 1760, depending on the COT sharing configuration, the BS may communicate with the UE A and the UE B in the MCOT period 1702. In an example, the BS may transmit a DRS (e.g., SSBs) and/or paging information for the UE A and/or the UE B. In an example, the BS may schedule the UE B for a UL transmission in a time period when the BS also schedules the UE A for a UL transmission in the same time period. The BS may configure the UE A and the UE B to transmit during the same time period based on FDM and/or CDM. In an example, the BS may schedule the UE B for a communication after the BS perform a CAT2 LBT and refrain from scheduling the UE B for a communication when the BS did not perform a CAT2 LBT. In an example, the BS may schedule the UE B for a UL transmission and may configure the UE B to perform a CAT2 LBT prior to the UL transmission.

Figure 18:
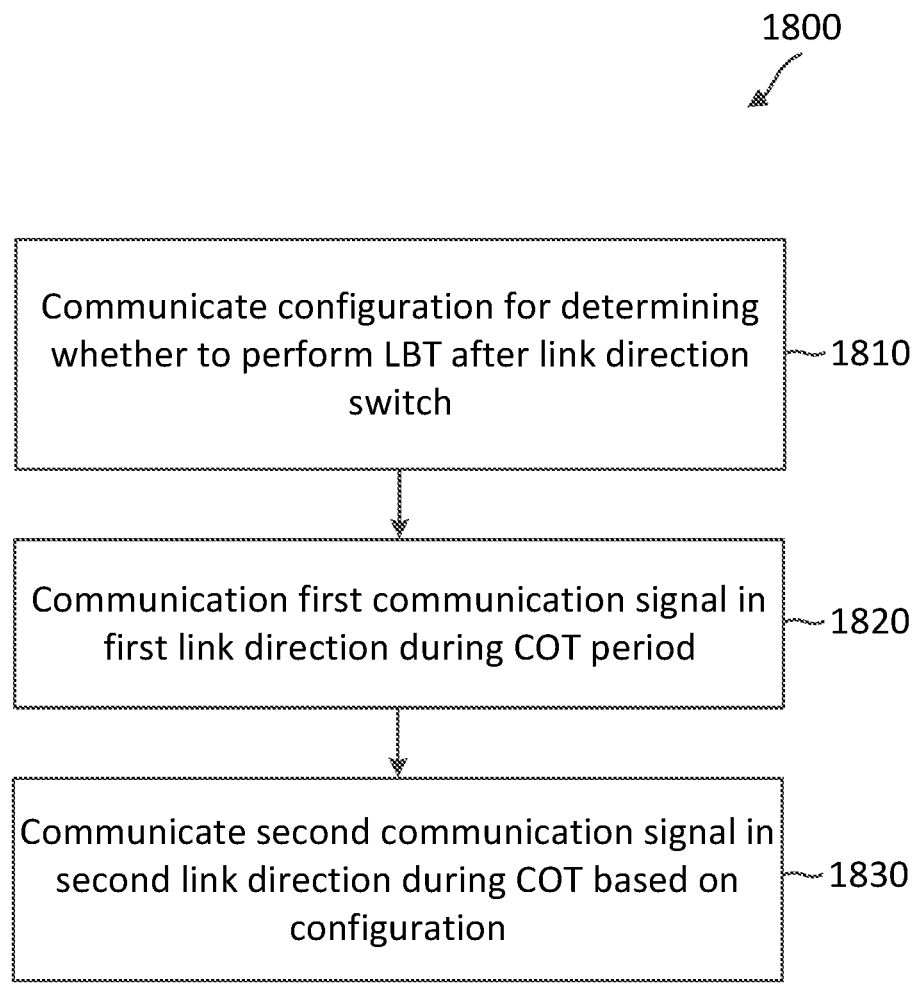
FIG. 18 is a flow diagram of a communication method according to some embodiments of the present disclosure.

FIG. 18 is a flow diagram of a communication method 1800 according to some embodiments of the present disclosure. Steps of the method 1800 can be executed by a computing device (e.g., a processor, processing circuit, and/or other suitable component) of a wireless communication device or other suitable means for performing the steps. For example, a wireless communication device, such as the UE 115 or UE 200, may utilize one or more components, such as the processor 202, the memory 204, the LBT module 208, the communication module 209, the transceiver 210, the modem 212, and the one or more antennas 216, to execute the steps of method 1800. In another example, a wireless communication device, such as the BS 105 or BS 300, may utilize one or more components, such as the processor 302, the memory 304, the LBT module 308, the communication module 309, the transceiver 310, the modem 312, and the one or more antennas 316, to execute the steps of method 1800. The method 1800 may employ similar mechanisms as in the schemes 400, 500, 600, 700, 800, 900, 1000, 1100, 1200, 1300, 1400, and 1600 as described above with respect to FIGS. 4, 5, 6, 7, 8, 9, 10, 11, 12, 13, 14, and 16, respectively, and the methods 1500 and 1700 described above with respect to FIGS. 15 and 17, respectively. As illustrated, the method 1800 includes a number of enumerated steps, but embodiments of the method 1800 may include additional steps before, after, and in between the enumerated steps. In some embodiments, one or more of the enumerated steps may be omitted or performed in a different order.

At step 1810, the method 1800 includes communicating, by a first wireless communication device with a second wireless communication device, a configuration for determining whether to perform an LBT (e.g., the CAT2 LBTs 540 and 1640) after a link direction switch (e.g., the DL-to-UL switches 403 and the UL-to-DL switches 404).

At step 1820, the method 1800 includes communicating, by the first wireless communication device with the second wireless communication device, a first communication signal in a first link direction during a COT period (e.g., the MCOT periods 402, 1502, 1602, and 1702) of the first wireless communication device or the second wireless communication device.

At step 1830, the method 1800 includes communicating, by the first wireless communication device with the second wireless communication device, a second communication signal in a second link direction different from the first link direction during the COT period based on the configuration.

In an embodiment, the first wireless communication device corresponds to a BS and the second wireless communication device corresponds to a UE. In some instances, the COT period is a COT period of the BS (e.g., based on a CAT4 LBTs 430 performed by the BS) and the configuration is transmitted by the first wireless communication device to the second wireless communication device. In some other instances, the COT period is a COT period of the UE (e.g., based on a CAT4 LBTs 1630 performed by the UE) and the configuration is received by the first wireless communication device from the second wireless communication device.

In an embodiment, the first wireless communication device corresponds to a UE and the second wireless communication device corresponds to a BS. In some instances, the COT period is a COT period of the BS (e.g., based on a CAT4 LBTs 430 performed by the BS) and the configuration is received by the first wireless communication device from the second wireless communication device. In some other instances, the COT period is a COT period of the UE (e.g., based on a CAT4 LBTs 1630 performed by the UE) and the configuration is transmitted by the first wireless communication device to the second wireless communication device.

In an embodiment, the first link direction corresponds to DL and the second link direction corresponds to UL.

In an embodiment, the first link direction responds to UL and the second link direction corresponds to DL.

In an embodiment, the configuration may include one or more no LBT-based transmission constraints, such as the link switch duration threshold 510, the transmission duration thresholds 610, 710, 910, and/or 1610, the no LBT time periods 1310 and 1412, the number of link switch threshold 810, the initial no LBT time period 1110 and 1210, and the COT joint ownership time period 1410.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further aspects of the present disclosure include the following:

Aspect 1 includes a method of wireless communication comprising: performing a first listen-before-talk (LBT) procedure associated with a channel, wherein a channel occupancy time (COT) is acquired for the channel based on the first LBT being successful; communicating a first communication signal in a first link direction during the COT; switching from the first link direction to a second link direction, the second link direction being different from the first link direction; and communicating after the switching, a second communication signal in the first link direction during the COT without performing a second LBT.

Aspect 2 includes the method of aspect 1, further comprising transmitting an indicator indicating COT sharing; and receiving based on the COT sharing, a third communication signal.

Aspect 3 includes the method of any of aspects 1-2, wherein the first LBT comprises a category 4 LBT.

Aspect 4 includes the method of any of aspects 1-3, further comprising switching from the second link direction to the first link direction; performing a third LBT associated with the channel; and communicating based on the third LBT being successful, a third communication signal in the first link direction.

Aspect 5 includes the method of any of aspects 1-4, wherein the performing the second LBT comprises performing a category 2 LBT.

Aspect 6 includes the method of any of aspects 1-5, wherein the performing the third LBT comprises performing the third LBT in response to a determination that a time period associated with the switching exceeds a link switch duration threshold.

Aspect 7 includes the method of any of aspects 1-6, wherein the communicating the second communication signal in the first link direction without performing the second LBT comprises communicating the second communication signal without performing the second LBT in response to a determination that a time period associated with the switching does not exceed a link switch duration.

Aspect 8 includes the method of any of aspects 1-7, wherein the communicating the second communication signal in the first link direction without performing the second LBT comprises communicating the second communication signal without performing the second LBT based on a transmission duration of the second communication signal.

Aspect 9 includes an apparatus for wireless communication comprising a memory; a transceiver; and at least one processor coupled to the memory and the transceiver, wherein the at least one processor is configured to perform a first listen-before-talk (LBT) procedure associated with a channel, wherein a channel occupancy time (COT) for the channel is acquired based on the first LBT being successful; communicate a first communication signal in a first link direction during the COT; switch from the first link direction to a second link direction, the second link direction being different from the first link direction; and communicate, after the switching, a second communication signal in the first link direction during the COT without performing a second LBT.

Aspect 10 includes the apparatus of aspect 9, wherein the at least one processor is further configured to transmit an indicator indicating COT sharing; and receive based on the COT sharing, a third communication signal.

Aspect 11 includes the apparatus of any of aspects 9 or 10, wherein the first LBT comprises a category 4 LBT.

Aspect 12 includes the apparatus of any of aspects 9-11, wherein the at least one processor is further configured to switch from the second link direction to the first link direction; perform a third LBT associated with the channel; and communicate based on the third LBT being successful, a third communication signal in the first link direction.

Aspect 13 includes the apparatus of any of aspects 9-12, wherein the second LBT comprises a category 2 LBT.

Aspect 14 includes the apparatus of any of aspects 9-13, wherein the at least one processor is further configured to perform the third LBT in response to a determination that a time period associated with the switching exceeds a link switch duration threshold.

Aspect 15 includes the apparatus of any of aspects 9-14, wherein the at least one processor is further configured to communicate the second communication signal without performing the second LBT in response to a determination that a time period associated with the switching does not exceed a link switch duration.

Aspect 16 includes the apparatus of any of aspects 9-15, wherein the at least one processor is further configured to communicate the second communication signal in the second link direction without performing the second LBT based on a transmission duration of the second communication signal.

Aspect 17 includes a user equipment (UE) comprising a memory; a transceiver; and at least one processor coupled to the memory and the transceiver, wherein the at least one processor is configured to receive, from the BS, a first communication signal in a first link direction during a channel occupancy time (COT) acquired by the BS; switch from the first link direction to a second link direction different from the first link direction; and transmit, to the BS based on the information, a second communication signal in the second link direction during the COT without performing a first listen-before-talk (LBT) procedure.

Aspect 18 includes the UE of aspect 17, wherein the at least one processor is further configured to receive, from the BS, information for determining whether to perform the first LBT procedure after the link direction switch, wherein the information is received via at least one of a radio resource control (RRC) message or a downlink control information (DCI) message.

Aspect 19 includes the UE of any of aspects 17-18, wherein the at least one processor is further configured to perform a second LBT in response to a determination that a time period associated with the switching exceeds a link switch duration threshold; and transmit, to the BS, a third communication signal in the second link direction based on the second LBT being successful.

Aspect 20 includes the UE of any of aspects 17-19, wherein the second LBT comprises a category 2 LBT.

Aspect 21 includes the UE of any of aspects 17-20, wherein the at least one processor is further configured to communicate the second communication signal in the second link direction without performing the first LBT in response to a determination that a time period associated with the switching does not exceed a link switch duration.

Aspect 22 includes the UE of any of aspects 17-21, wherein the at least one processor is further configured to communicate the second communication signal in the second link direction without performing the first LBT based on a transmission duration of the second communication signal.

Aspect 23 includes the UE of any of aspects 17-22, wherein the at least one processor is further configured to receive, from the BS, an indicator indicating a transfer of the COT to the UE; and transmit, to the BS, the second communication signal in the second link direction during the COT period of the BS without performing the first LBT procedure based on the transfer of the COT to the UE.

Aspect 24 includes a base station comprising a memory; a transceiver; and at least one processor coupled to the memory and the transceiver, wherein the wherein the at least one processor is configured to receive, from a first user equipment (UE), channel occupancy time (COT) sharing information associated with a COT acquired by the first UE; and transmit, to a plurality of other UEs based on the COT sharing information, a non-unicast signal during the COT.

Aspect 25 includes the BS of aspect 24, wherein the COT sharing information is received via uplink control information (UCI).

Aspect 26 includes the BS of any of aspects 24-25, wherein the COT sharing configuration indicates the BS may transmit only in the broadcast mode during the COT transferred to the BS.

Aspect 27 includes the BS of any of aspects 24-26 wherein the first communication signal comprises at least one of a synchronization signal block (SSB); a physical broadcast channel (PBCH); a master information block (MIB); a system information block (SIB); a paging signal; or a transport block.

Aspect 28 includes the BS of any of aspects 24-27, wherein the at least one processor is further configured to transmit, to a second UE based on the COT sharing configuration, an indicator indicating a transfer of the COT to the second UE; and receive, from the second UE based on the transfer of the COT to the second UE, a second communication signal.

Aspect 29 includes the BS of any of aspects 24-28, wherein the at least one processor is further configured to transmit, to the second UE, an indicator indicating a listen-before-talk (LBT) category associated with the second communication signal.

Aspect 30 includes the BS of any of aspects 24-29, wherein the BS is further configured to transmit, to the second UE, the indicator indicating the transfer of the COT to the second UE based on a priority level associated with the second communication signal.

Aspect 31 includes the BS of any of aspects 24-30, wherein the at least one processor is further configured to perform a LBT procedure based on a duration between an uplink transmission from the first UE and the non-unicast signal, wherein the non-unicast signal is transmitted based on the duration.

Aspect 32 includes the BS of any of aspects 24-31, the at least one processor is further configured to transmit, to the first UE, a unicast signal during the COT.

Aspect 33 includes a non-transitory computer-readable medium storing one or more instructions for wireless communication, the one or more instructions comprising one or more instructions that, when executed by one or more processors of a base station (BS), cause the BS to perform any one of aspects 1-8.

Aspect 34 includes a non-transitory computer-readable medium storing one or more instructions for wireless communication, the one or more instructions comprising one or more instructions that, when executed by one or more processors of a base station (BS), cause the BS to perform any one of aspects 9-16.

Aspect 35 includes a non-transitory computer-readable medium storing one or more instructions for wireless communication, the one or more instructions comprising one or more instructions that, when executed by one or more processors of a user equipment (UE), cause the UE to perform any one of aspects 17-23.

Aspect 36 includes a non-transitory computer-readable medium storing one or more instructions for wireless communication, the one or more instructions comprising one or more instructions that, when executed by one or more processors of user equipment (UE), cause the UE to perform any one of aspects 24-32.

Aspect 37 includes a base station (BS) comprising one or more means to perform any one or more of aspects 1-8.

Aspect 38 includes a base station (BS) comprising one or more means to perform any one or more of aspects 9-16.

Aspect 39 includes a user equipment (UE) comprising one or more means to perform any one or more of aspects 17-23.

Aspect 40 includes a user equipment (UE) comprising one or more means to perform any one or more of aspects 24-32.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A user equipment (UE), comprising:
   one or more transceivers;
   one or more memories; and
   one or more processors coupled to the one or more transceivers and the one or more memories, the one or more memories storing instructions that are executable by the one or more processors, individually or in any combination, to cause the UE to:
   receive, from a network unit, a first communication signal in a first link direction during a channel occupancy time (COT) acquired by the network unit;
   switch from the first link direction to a second link direction different from the first link direction;
   receive, from the network unit via downlink control information (DCI), information for determining whether to perform a first listen-before-talk (LBT) procedure for the second link direction, wherein the DCI information includes an indication of a no LBT mode; and
   transmit, to the network unit, a second communication signal in the second link direction during the COT without performing the first LBT procedure based on the DCI information and a transmission duration associated with the second communication signal satisfying a transmission duration threshold.

2. The UE of claim 1, wherein the one or more processors are further configured, individually or in any combination, to cause the UE to:
   perform a second LBT in response to a determination that a time period associated with a second switch from the first link direction to a second link direction exceeds a link switch duration threshold; and transmit, to the network unit, a third communication signal in the second link direction based on the second LBT being successful.

3. The UE of claim 2, wherein the second LBT comprises a category 2 LBT.

4. The UE of claim 1, wherein the one or more processors are further configured, individually or in any combination, to cause the UE to communicate the second communication signal in the second link direction without performing the first LBT further based on a determination that a time period associated with the switch from the first link direction to the second link direction does not exceed a link switch duration threshold.

5. The UE of claim 1, wherein the one or more processors are further configured, individually or in any combination, to cause the UE to:
    perform a second LBT in response to a transmission duration associated with a third communication signal exceeding the transmission duration threshold; and
    transmit, to the network unit, the third communication signal in the second link direction based on the second LBT being successful.

6. The UE of claim 5, wherein the second LBT comprises a category 2 LBT.

7. The UE of claim 1, wherein the transmission duration threshold is greater than or equal to 0.5 milliseconds.

8. The UE of claim 1, wherein the DCI is a UE-specific DCI.

9. The UE of claim 1, wherein the DCI is a group common DCI.

10. A method of wireless communication performed at a user equipment (UE), the method comprising:
    receiving, from a network unit, a first communication signal in a first link direction during a channel occupancy time (COT) acquired by the network unit;
    switching from the first link direction to a second link direction different from the first link direction;
    receiving, from the network unit via downlink control information (DCI), information for determining whether to perform a first listen-before-talk (LBT) procedure for the second link direction, wherein the DCI information includes an indication of a no LBT mode; and
    transmitting, to the network unit, a second communication signal in the second link direction during the COT without performing the first LBT procedure based on the DCI information and a transmission duration associated with the second communication signal satisfying a transmission duration threshold.

11. The method of claim 10, further comprising:
    performing a second LBT in response to a determination that a time period associated with a second switch from the first link direction to a second link direction exceeds a link switch duration threshold; and
    transmitting, to the network unit, a third communication signal in the second link direction based on the second LBT being successful.

12. The method of claim 11, wherein the second LBT comprises a category 2 LBT.

13. The method of claim 10, wherein the transmitting the second communication signal in the second link direction without performing the first LBT is further based on a determination that a time period associated with the switching does not exceed a link switch duration.

14. The method of claim 10, further comprising:
    performing a second LBT in response to a transmission duration associated with a third communication signal exceeding the transmission duration threshold; and
    transmitting, to the network unit, the third communication signal in the second link direction based on the second LBT being successful.

15. The method of claim 14, wherein the second LBT comprises a category 2 LBT.

16. The method of claim 10, wherein the transmission duration threshold is greater than or equal to 0.5 milliseconds.

17. The method of claim 10, wherein the DCI is a UE-specific DCI.

18. The method of claim 10, wherein the DCI is a group common DCI.

19. A non-transitory computer-readable medium storing one or more instructions for wireless communication that, when executed by one or more processors, individually or in any combination, cause a user equipment (UE) to:
    receive, from a network unit, a first communication signal in a first link direction during a channel occupancy time (COT) acquired by the network unit;
    switch from the first link direction to a second link direction different from the first link direction;
    receive, from the network unit via downlink control information (DCI), information for determining whether to perform a first listen-before-talk (LBT) procedure for the second link direction, wherein the DCI information includes an indication of a no LBT mode; and
    transmit, to the network unit, a second communication signal in the second link direction during the COT without performing the first LBT procedure based on the DCI information and a transmission duration associated with the second communication signal satisfying a transmission duration threshold.

20. The non-transitory computer-readable medium of claim 19, wherein the one or more instructions for wireless communication, when executed by the one or more processors, individually or in any combination, further cause the UE to:
    performing a second LBT in response to a determination that a time period associated with a second switch from the first link direction to a second link direction exceeds a link switch duration threshold; and
    transmitting, to the network unit, a third communication signal in the second link direction based on the second LBT being successful.

21. The non-transitory computer-readable medium of claim 20, wherein the second LBT comprises a category 2 LBT.

22. The non-transitory computer-readable medium of claim 19, wherein the one or more instructions for wireless communication, when executed by the one or more processors, individually or in any combination, further cause the UE to:
    communicate the second communication signal in the second link direction without performing the first LBT further based on a determination that a time period associated with the switch from the first link direction to the second link direction does not exceed a link switch duration threshold.

23. The non-transitory computer-readable medium of claim 19, wherein the one or more instructions for wireless communication, when executed by the one or more processors, individually or in any combination, further cause the UE to:

perform a second LBT in response to a transmission duration associated with a third communication signal exceeding the transmission duration threshold; and transmit, to the network unit, the third communication signal in the second link direction based on the second LBT being successful.

24. The non-transitory computer-readable medium of claim 23, wherein the second LBT comprises a category 2 LBT.

25. The non-transitory computer-readable medium of claim 19, wherein the transmission duration threshold is greater than or equal to 0.5 milliseconds.

26. The non-transitory computer-readable medium of claim 19, wherein the DCI is a UE-specific DCI.

27. The non-transitory computer-readable medium of claim 19, wherein the DCI is a group common DCI.

* * * * *